(12) United States Patent
Zhou et al.

(10) Patent No.: US 11,700,046 B2
(45) Date of Patent: Jul. 11, 2023

(54) BEAM FAILURE AVOIDANCE BASED ON DETECTED INTERFERENCE

(71) Applicant: QUALCOMM Incorporated, San Diego, CA (US)

(72) Inventors: Shanyu Zhou, San Diego, CA (US); Jelena Damnjanovic, Del Mar, CA (US); Junyi Li, Fairless Hills, PA (US); Tao Luo, San Diego, CA (US); Juan Montojo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/339,132

(22) Filed: Jun. 4, 2021

(65) Prior Publication Data

US 2022/0393746 A1 Dec. 8, 2022

(51) Int. Cl.
| | |
|---|---|
| *H04B 7/06* | (2006.01) |
| *H04B 17/318* | (2015.01) |
| *H04W 24/10* | (2009.01) |
| *H04W 76/19* | (2018.01) |
| *H04W 80/02* | (2009.01) |
| *H04B 17/17* | (2015.01) |
| *H04B 17/336* | (2015.01) |

(52) U.S. Cl.
CPC ......... *H04B 7/0695* (2013.01); *H04B 17/318* (2015.01); *H04B 17/336* (2015.01); *H04W 24/10* (2013.01); *H04W 76/19* (2018.02); *H04W 80/02* (2013.01)

(58) Field of Classification Search
CPC .. H04B 7/0695; H04B 17/318; H04B 17/336; H04W 24/10; H04W 76/19; H04W 80/02
See application file for complete search history.

(56) References Cited

U.S. PATENT DOCUMENTS

| | | | |
|---|---|---|---|
| 2019/0394082 A1* | 12/2019 | Cirik | H04W 76/28 |
| 2021/0160718 A1* | 5/2021 | Yum | H04L 5/0057 |
| 2021/0250793 A1* | 8/2021 | Shi | H04W 74/0833 |

* cited by examiner

*Primary Examiner* — Harry H Kim
(74) *Attorney, Agent, or Firm* — Qualcomm Incorporated

(57) ABSTRACT

A UE may receive a BFD-RS and calculate, based on the BFD-RS, one or more of a value of an RSSI or at least one of a value of an SNR or a value of an RSRP, such that the UE may report a BFI based on the calculated values. The UE may initiate at least one of a total BFI timer or a consecutive BFI timer when a first BFI of a plurality of BFIs is stored, and increment at least one of a total BFI counter or a consecutive BFI counter when each of the plurality of BFIs is stored. A BFD procedure may be performed if at least one of the total BFI counter is greater than or equal to a maximum total count or the consecutive BFI counter is greater than or equal to a maximum consecutive count prior to an expiration of respective BFI timers.

26 Claims, 16 Drawing Sheets

500 ↗

| | High (SNR/RSRP > threshold_SNR/threshold_RSRP) | Low (SNR/RSRP < threshold_SNR/threshold_RSRP) |
|---|---|---|
| High (RSSI > threshold_rssi) | No BFI | No BFI |
| Low (RSSI < threshold_rssi) | No BFI | BFI |

550 ↗

| | High (SNR/RSRP − RSSI > threshold_diff) | Low (SNR/RSRP − RSSI < threshold_diff) |
|---|---|---|
| High (RSSI > threshold_rssi) | No BFI | No BFI |
| Low (RSSI < threshold_rssi) | No BFI | BFI |

FIG. 5

BEAM FAILURE AVOIDANCE BASED ON DETECTED INTERFERENCE

TECHNICAL FIELD

The present disclosure relates generally to communication systems, and more particularly, to beam failure avoidance based on detected interference.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from a base station, a beam failure detection-reference signal (BFD-RS); calculate, based on the BFD-RS, one or more of a value of a received signal strength indicator (RSSI) or at least one of a value of a signal-to-noise ratio (SNR) or a value of a reference signal received power (RSRP); and store a beam failure indicator (BFI) based on the one or more of the value of the RSSI or the at least one of the value of the SNR or the value of the RSRP.

In a further aspect of the disclosure, a method, a computer-readable medium, and an apparatus are provided. The apparatus may transmit, to a user equipment (UE), a BFD-RS, one or more of a value of an RSSI or at least one of a value of an SNR or a value of an RSRP being based on the BFD-RS; and receive, from the UE, a beam failure recovery (BFR) request based on at least one BFI associated with the one or more of the value of the RSSI or the at least one of the value of the SNR or the value of the RSRP.

In yet a further aspect of the disclosure, a method, a computer-readable medium, and an apparatus are provided. The apparatus may store each BFI of a plurality of BFIs; initiate at least one of a total BFI timer or a consecutive BFI timer when a first BFI of the plurality of BFIs is stored, the total BFI timer corresponding to all of the plurality of BFIs, the consecutive BFI timer corresponding to consecutive BFIs of the plurality of BFIs; increment at least one of a total BFI counter or a consecutive BFI counter when each of the plurality of BFIs is stored, the total BFI counter corresponding to all of the plurality of BFIs, the consecutive BFI counter corresponding to the consecutive BFIs of the plurality of BFIs; and perform a BFR procedure if at least one of the total BFI counter is greater than or equal to a maximum total count prior to an expiration of the total BFI timer or the consecutive BFI counter is greater than or equal to a maximum consecutive count prior to an expiration of the consecutive BFI timer.

In still a further aspect of the disclosure, a method, a computer-readable medium, and an apparatus are provided. The apparatus may configure a UE with at least one of a total BFI timer, a total BFI counter, and a threshold for a maximum total count corresponding to all of a plurality of BFIs, or a consecutive BFI timer, a consecutive BFI counter, and a threshold for a maximum consecutive count corresponding to consecutive BFIs of the plurality of BFIs; and perform a BFR procedure with the UE based on at least one of the total BFI counter being greater than or equal to the threshold for the maximum total count prior to an expiration of the total BFI timer, or the consecutive BFI counter being greater than or equal to the threshold for the maximum consecutive count prior to an expiration of the consecutive BFI timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates tables for determining whether to indicate a beam failure indicator (BFI) based on a plurality of configured thresholds.

DETAILED DESCRIPTION

Figure 1:
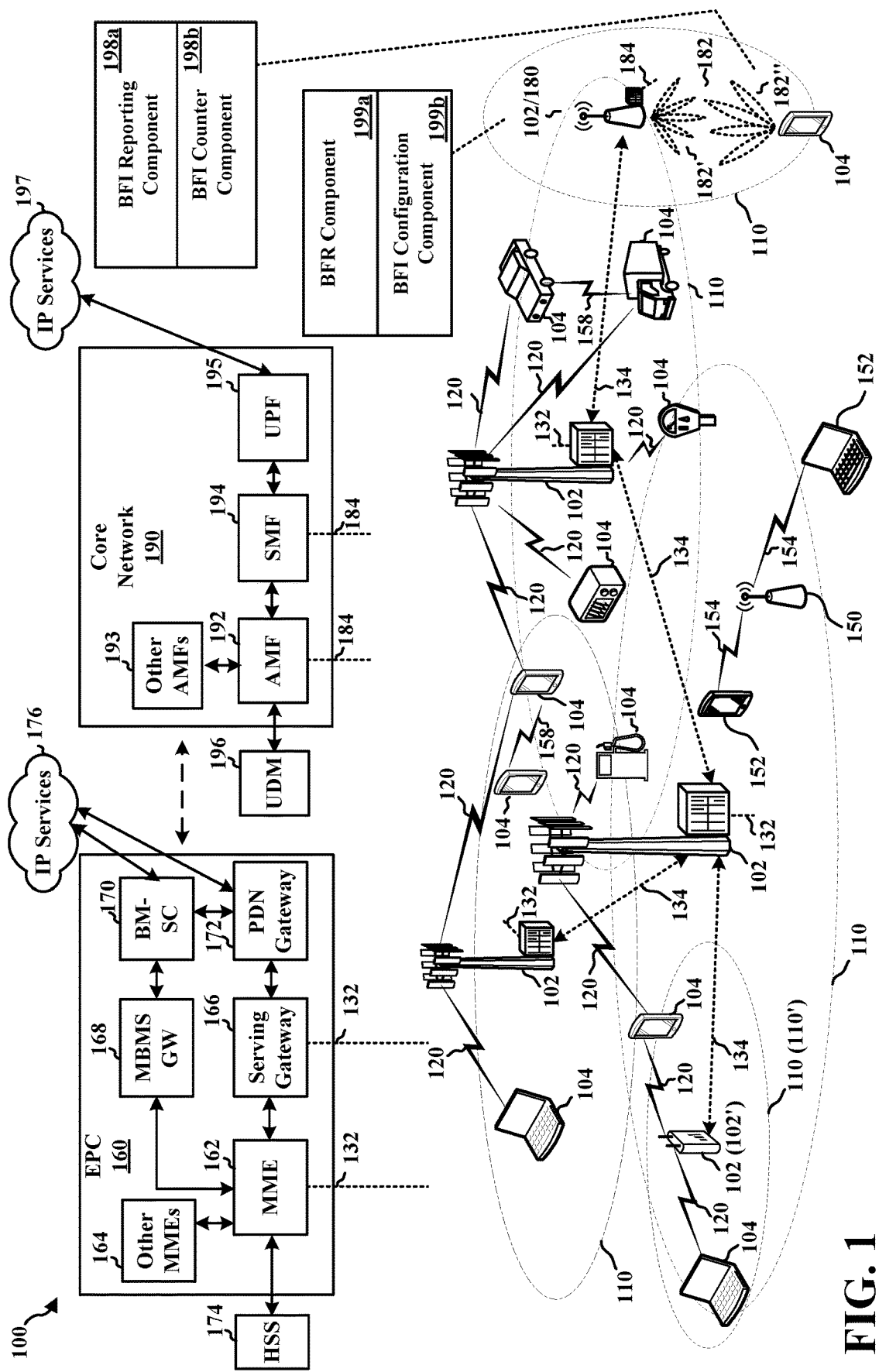
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a beam failure indicator (BFI) reporting component 198a configured to receive, from a base station, a beam failure detection-reference signal (BFD-RS); calculate, based on the BFD-RS, one or more of a value of a received signal strength indicator (RSSI) or at least one of a value of a signal-to-noise ratio (SNR) or a value of a reference signal received power (RSRP); and store a BFI based on the one or more of the value of the RSSI or the at least one of the value of the SNR or the value of the RSRP. The UE 104 may also include a BFI counter component 198b configured to store each BFI of a plurality of BFIs; initiate at least one of a total BFI timer or a consecutive BFI timer when a first BFI of the plurality of BFIs is stored, the total BFI timer corresponding to all of the plurality of BFIs, the consecutive BFI timer corresponding to consecutive BFIs of the plurality of BFIs; increment at least one of a total BFI counter or a consecutive BFI counter when each of the plurality of BFIs is stored, the total BFI counter corresponding to all of the plurality of BFIs, the consecutive BFI counter corresponding to the consecutive BFIs of the plurality of BFIs; and perform a beam failure recovery (BFR) procedure if at least one of the total BFI counter is greater than or equal to a maximum total count prior to an expiration of the total BFI timer or the consecutive BFI counter is greater than or equal to a maximum consecutive count prior to an expiration of the consecutive BFI timer.

In certain aspects, the base station 180 may include a BFR component 199a configured to transmit, to a UE, a BFD-RS, one or more of a value of an RSSI or at least one of a value of an SNR or a value of an RSRP being based on the BFD-RS; and receive, from the UE, a BFR request based on at least one BFI associated with the one or more of the value of the RSSI or the at least one of the value of the SNR or the value of the RSRP. The base station 180 may also include a BFI configuration component 199b configured to configure a UE with at least one of a total BFI timer, a total BFI counter, and a threshold for a maximum total count corresponding to all of a plurality of BFIs, or a consecutive BFI timer, a consecutive BFI counter, and a threshold for a maximum consecutive count corresponding to consecutive BFIs of the plurality of BFIs; and perform a BFR procedure with the UE based on at least one of the total BFI counter being greater than or equal to the threshold for the maximum total count prior to an expiration of the total BFI timer, or the consecutive BFI counter being greater than or equal to the threshold for the maximum consecutive count prior to an expiration of the consecutive BFI timer. Although the following description may be focused on 5G NR, the concepts described herein may be applicable to other similar areas, such as LTE, LTE-A, CDMA, GSM, and other wireless technologies.

Figure 2:
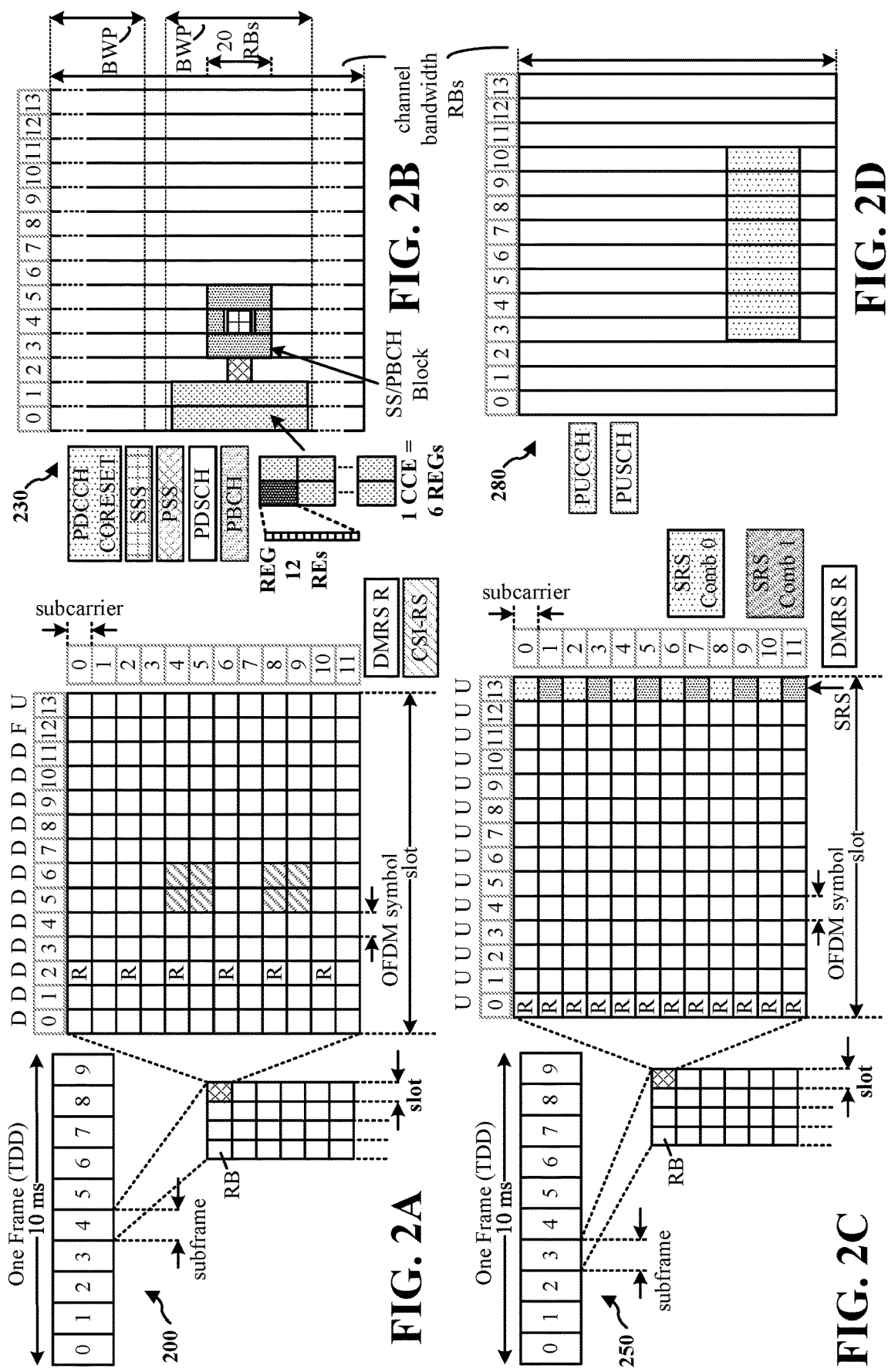
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
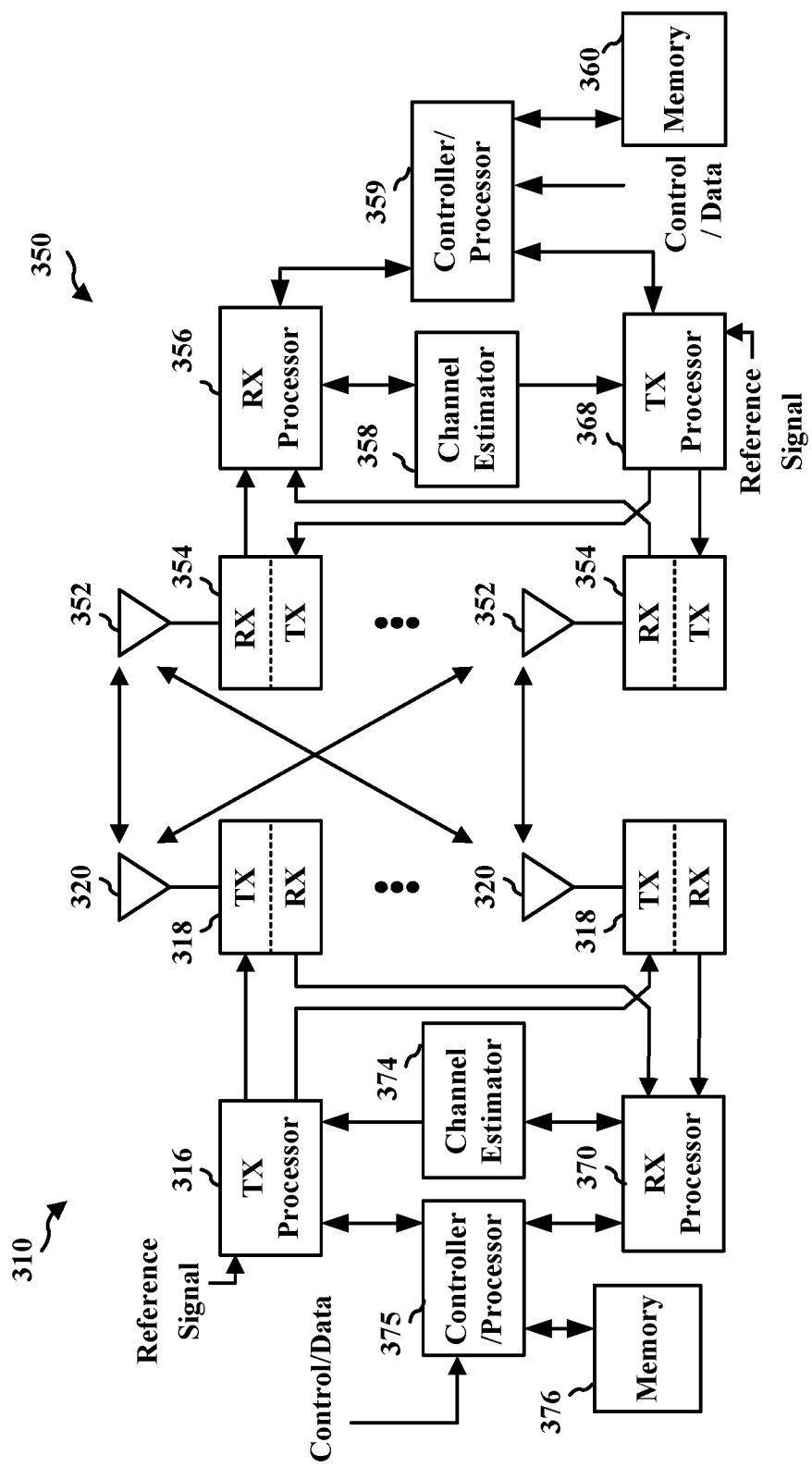
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the BFI reporting component 198a and/or the BFI counter component 198b of FIG. 1.

At least one of the TX processor 316, the RX processor 370, and the controller/processor 375 may be configured to perform aspects in connection with the BFR component 199a and/or the BFI configuration component 199b of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4A:
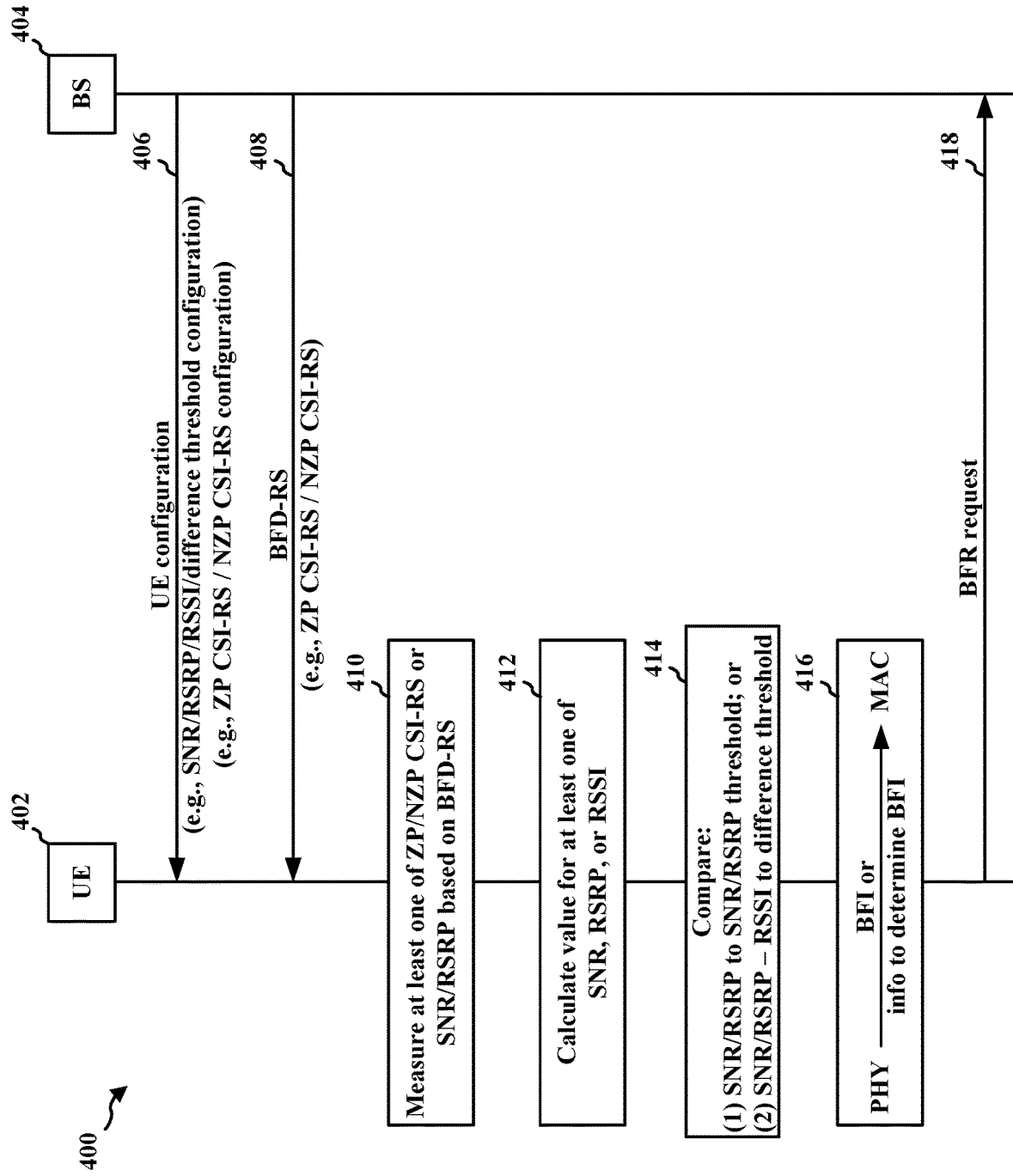
FIG. 4A is a call flow diagram illustrating communications between a UE and a base station.
Figure 4B:
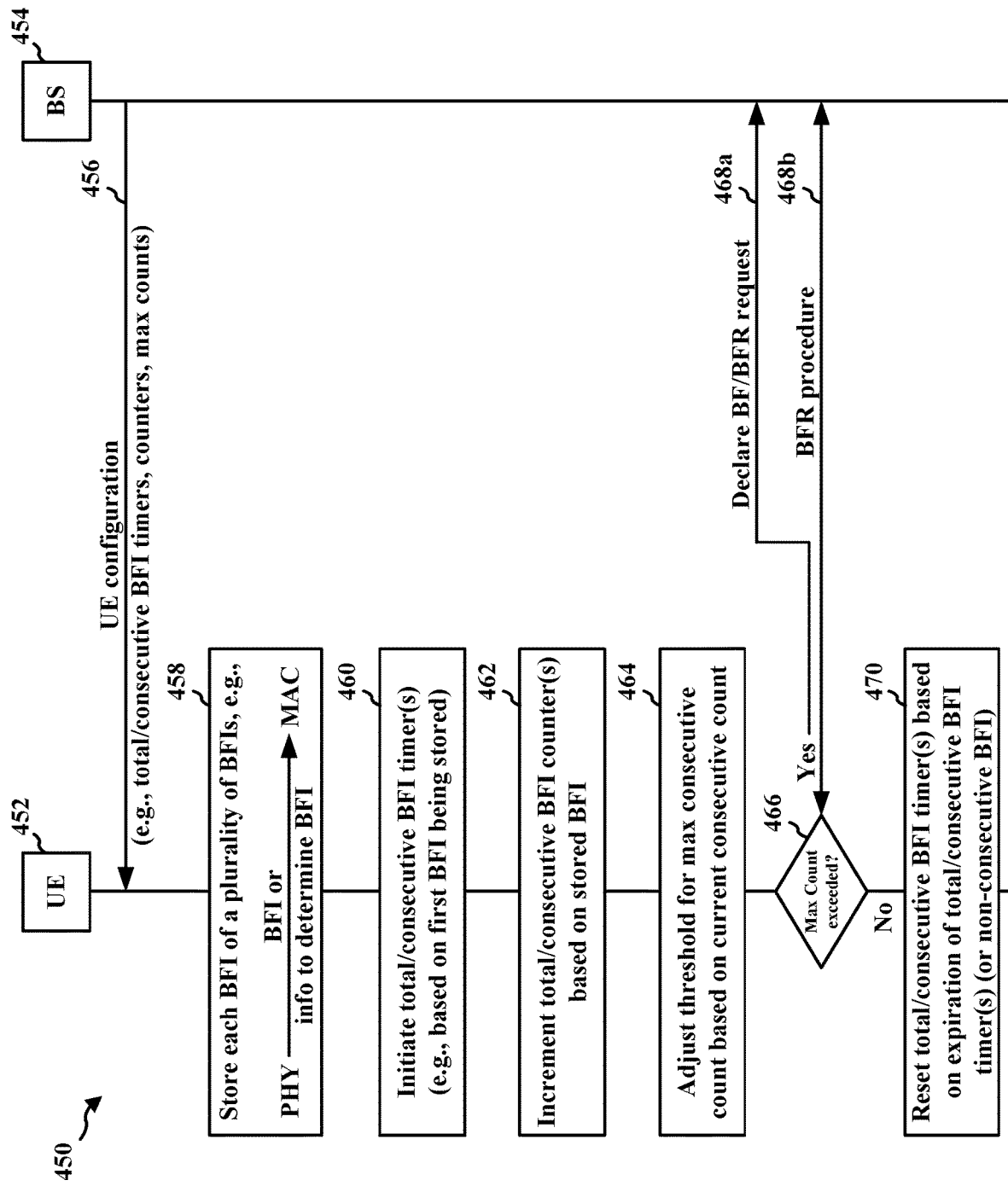
FIG. 4B is a call flow diagram illustrating communications between a UE and a base station.

FIGS. 4A-4B are call flow diagrams 400-450 illustrating communications between a UE 402/452 and a base station 404/454. Referring to the call flow diagram 400, the UE 402 may receive, at 406, a UE configuration from the base station 404. The UE configuration received, at 406, may be a configuration for an SNR threshold, an RSRP threshold, an RSSI threshold, and/or a difference threshold. In further aspects, the UE configuration received, at 406, may be a configuration for the UE 402 to measure a zero power (ZP) CSI-RS indicative of inter-cell interference and/or a non-zero power (NZP) CSI-RS indicative of intra-cell interference.

At 408, the base station 404 may transmit a BFD-RS to the UE 402. In examples, the BFD-RS may be associated with a ZP CSI-RS or a NZP CSI-RS. At 410, the UE 402 may measure at least one of ZP/NZP CSI-RS or SNR/RSRP based on the BFD-RS received, at 408. At 412, the UE 402 may calculate, based on the BFD-RS received, at 408, and the measurement performed, at 410, a value for at least one of the SNR, the RSRP, or the RSSI.

At 414, the UE 402 may compare one or more of the calculated values to a corresponding threshold configured to the UE 402 via the UE configuration received at 406. For example, the UE 402 may compare, at 414(1), the value calculated for the SNR/RSRP to the SNR/RSRP threshold configured to the UE 402 via the UE configuration received at 406. In another example, the UE 402 may compare, at 414(2), a value calculated for a difference between the SNR/RSRP and the RSSI to the difference threshold configured to the UE 402 via the UE configuration received at 406.

At 416, BFI may be stored at the UE 402 based on the comparison performed, at 414, by the UE 402. In an example, the PHY layer of the UE 402 may indicate the BFI to the MAC layer of the UE 402 for storing the BFI. In another example, the PHY layer of the UE 402 may indicate to the MAC layer information for the MAC layer to determine and store the BFI. At 418, the UE 402 may transmit a BFR request to the base station 404 based on a beam failure associated with the stored BFI.

In directional systems, such as 5G NR systems, beams may be communicated between a transmitter and a receiver in association with a communication performance level. Due to unpredictable characteristics of a wireless environment, such as unexpected beam blockages, the beams may be subjected to a beam failure event that may result in execution of a BFR procedure. The beams may be particularly susceptible to beam failure at higher frequency, such as frequency range 2 (FR2) and frequency range 2x (FR2x).

Beam failure may occur in association with a BFI indicative of a signal-to-interference-plus-noise ratio (SINR) measurement. The BFI may be based on a decreased channel quality (e.g., noisy channel) and/or temporary interference from other beams and/or other UEs. Thus, even if the channel quality satisfies a threshold quality level, an increased amount of temporary interference may trigger the beam failure. Decreased channel quality may be a reasonable condition for triggering the beam failure, whereas temporary interference may be an unnecessary condition for triggering the beam failure, as temporary interference may be alleviated after a certain amount of time.

Some BFIs may not provide differentiation between different causes of the BFIs, such as decreased channel quality or temporary interference. For example, the base station 404 may transmit, at 408, the BFD-RS to the UE 402 for measuring a SINR of the BFD-RS and estimating a block error rate (BLER). The BLER and the SINR may have a 1:1 linear correlation. The UE 402 may compare the estimated BLER to a threshold_bler. If the estimated BLER is greater than the threshold_bler, a BFI may be determined at the PHY layer. The BFI may be reported from the PHY layer and counted at an upper layer (e.g., MAC layer) based on a low SINR measurement. A counter for the BFI may be incremented by 1 count whenever BFI is indicated based on the SINR measurement.

The upper layer may count the BFI, even if the BFI is associated with temporary interference. Upon detecting a sufficient number of BFIs/counts of BFI, the UE 402 may trigger the BFR procedure. Too many unnecessary BFR procedures may result in wasted time and/or power consumption at the UE 402 and/or the base station 404. Configuring the UE 402 to distinguish between interference-related BFI and channel quality-related BFI may improve performance at the UE 402. For example, a BFI determination may be based on excluding interference-related BFI, so that reported BFI is indicative of a decreased channel quality.

BFI avoidance for temporary interference may include utilizing channel strength measurement parameters, such as SNR and/or RSRP, to determine BFI. If the channel strength parameters are below a threshold, the channel may be of decreased quality (e.g., noisy) and BFI may be recorded. In such cases, interference conditions may not be associated with the channel strength parameters. Thus, the measured value may be indicative of channel strength without regard to interference conditions. Measurement values based on the channel strength parameters may be compared to one or more preconfigured thresholds (e.g., threshold_SNR and threshold_RSRP). For example, if the measured SNR<threshold_SNR or the measured RSRP<threshold_RSRP, BFI may be determined by the UE 402 and, e.g., reported from the PHY layer of the UE 402 to the MAC layer of the UE 402.

FIG. 5 illustrates diagrams 500-550 for determining whether to indicate a BFI based on a plurality of configured thresholds. For example, referring to the diagram 500, the determination of whether to report the BFI may be based on an absolute value of an RSSI and the SNR/RSRP measurement. The RSSI may be indicative of the interference/noise. Thus, the RSSI may be compared to a first threshold (e.g., threshold_rssi) to determine whether the interference may be higher or lower than the first threshold. The SNR/RSRP may be similarly compared to a second threshold (e.g., the threshold_SNR or the threshold_RSRP) to determine whether the SNR/RSRP may be higher or lower than the second threshold.

If the RSSI is lower than the first threshold and the SNR/RSRP is higher than the second threshold, the BFI may not be reported, as the higher SNR/RSRP may indicate that the decreased channel quality is caused by interference, given that the SNR/RSRP is above the second threshold. However, if the RSSI is higher than the first threshold and the SNR/RSRP is lower than the second threshold, the BFI may be reported, as either the interference may be too strong or the channel may be too noisy. Regardless of whether the SNR/RSRP is higher or lower than the second threshold, the BFI may not be reported when the RSSI is higher than the first threshold, as the strength of the received signal may be at an acceptable level.

Referring to the diagram 550, the determination of whether to report the BFI may be based on a relative value of a difference between the SNR/RSRP and the RSSI. The RSSI may be indicative of the interference/noise. Thus, the RSSI may be compared to the first threshold (e.g., threshold_rssi) to determine whether the interference may be higher or lower than the first threshold. A difference between the SNR/RSRP and the RSSI may be similarly compared to a third threshold (e.g., the threshold_diff) to determine whether the SNR/RSRP may be higher or lower than the third threshold.

If the RSSI is lower than the first threshold and the difference between the SNR/RSRP and the RSSI is higher than the third threshold/difference threshold, the BFI may not be reported, as a higher difference value may indicate that the decreased channel quality is caused by interference, given that the difference value is above the third threshold. However, if the RSSI is higher than the first threshold and the difference between the SNR/RSRP and the RSSI is lower than the third threshold, the BFI may be reported, as either the interference may be too strong or the channel may be too noisy. Regardless of whether the difference between the SNR/RSRP and the RSSI is higher or lower than the third threshold, the BFI may not be reported when the RSSI is higher than the first threshold, as the strength of the received signal may be at an acceptable level.

The UE 402 may be configured, at 406, with thresholds, such as threshold_SNR, threshold_RSRP, threshold_RSSI, and threshold_diff, for the comparisons, at 414, of the SNR/RSRP, the RSSI, and the difference value. A configuration entity, such as the base station 404, may utilize an RRC configuration (e.g., via layer-3 (L3) signaling) to configure the thresholds, at 406. RRC signaling may also be used to configure a set of multiple values for the SNR/RSRP, RSSI, and difference parameters. The base station 404 may use DCI and MAC-control element (MAC-CE) (e.g., layer-1/layer-2 (L1/L2) signaling) to signal a change to the parameter values.

A BFI determining entity may be located at the PHY layer or the MAC layer. For example, at 416, the BFI may be determined at the PHY layer based on the parameter values and the configured thresholds. The PHY layer may then report the BFI to the MAC layer. In further examples, at 416, the BFI may be determined at the MAC layer based on PHY layer reporting of parameter values and measurements to the MAC layer. The MAC layer may compare the parameter values and measurement to the corresponding threshold, and determine the BFI.

The UE 402 may be configured, at 406, to differentiate between measured interference sources. For example, the UE 402 may be configured, at 406, to determine whether detected interference is associated with inter-cell interference or intra-cell interference. The UE 402 may use a NZP CSI-RS or a ZP CSI-RS to measure, at 410, and/or differentiate the different types of interference. In order to measure, at 410, inter-cell interference, the base station 404 may configure the UE 402 with the ZP CSI-RS. The UE 402 may measure, at 410, the received power in the corresponding ZP CSI-RS occasion. That is, the UE 402 may determine that a particular occasion is the ZP CSI-RS occasion based on the occasion not including a received power from the serving cell. Thus, measured power received by the UE 402 may be indicative of interference power received from other cells. In order to measure, at 410, the intra-cell interference, the base station 404 may configure the UE 402 with NZP CSI-RS. For each NZP CSI-RS, the UE 402 may determine whether the NZP CSI-RS is for the UE 402 or for other UEs. If the UE 402 measures, at 410, the received power of the NZP CSI-RS for other/neighboring UEs, the measured power may be indicative of interference power received from the other/neighboring UEs (e.g., intra-cell interference).

Referring to the call flow diagram 450, the UE 452 may receive, at 456, a UE configuration from the base station 454. The UE configuration received, at 456, may be a configuration for total/consecutive BFI timers, total/consecutive BFI counters, and/or thresholds for maximum total/consecutive BFI counts. At 458, the UE 452 may store/record each BFI of a plurality of BFIs. In an example, the PHY layer of the UE 452 may indicate the BFI to the MAC layer of the UE 452 for storing the BFI, at 458. In another example, the PHY layer of the UE 452 may indicate to the MAC layer information for the MAC layer to determine the BFI and store the BFI, at 458.

At 460, the UE 452 may initiate the total/consecutive BFI timer(s) (e.g., based on a first BFI of the plurality of BFIs being stored, at 458). The total BFI timer may correspond to all of the plurality of BFIs stored, at 458, and the consecutive BFI timer may correspond to consecutive BFIs of the plurality of BFIs stored, at 458. At 462, the UE 452 may increment the total/consecutive BFI counter(s) based on the stored BFI. For example, the UE 452 may increment, at 462, the total BFI counter for all of the plurality of BFIs that are stored, at 458, whereas the UE 452 may increment, at 462, the consecutive BFI counter solely for consecutive BFIs of the plurality of BFIs that are stored, at 458.

At 464, the UE 452 may adjust the threshold for the maximum consecutive count based on a current consecutive count. For example, the adjustment, at 464, may be associated with incrementing the consecutive BFI counter linearly if the consecutive BFI counter is less than the threshold for the maximum consecutive count, or incrementing the consecutive BFI counter exponentially if the consecutive BFI counter is greater than or equal to the threshold for the maximum consecutive count.

At 466, the UE 452 may determine whether the threshold for the maximum total/consecutive count is exceeded. If the threshold for the maximum total/consecutive count is determined, at 466, to be exceeded prior to an expiration of at least one of the total/consecutive timers, the UE 452 may declare a beam failure for which the UE 452 may transmit, at 468a, a BFR request to the base station 454. At 468b, the UE 452 and the base station 454 may perform a BFR procedure based on the BFR request. If the threshold for the maximum total/consecutive count is determined, at 466, not to be exceeded prior to the expiration of at least one of the total/consecutive timers, the UE 452 may reset, at 470, the total/consecutive BFI timer(s) based on the expiration of the total/consecutive BFI timer(s). The consecutive BFI timer may also be reset, 470, by the UE 452 based on non-consecutive BFI.

Accordingly, after the BFI is either reported from the PHY layer or calculated at the MAC layer, at 416 in the call flow diagram 400, which may correspond to 458 in the call flow diagram 450, a counter may be incremented, at 462, at the MAC layer for maintaining a count of BFIs. If the counter at the MAC layer reaches a predetermined count of BFIs before a timer expires, the UE 452 may determine, at 466, that a beam failure detection (BFD) event has occurred. The BFIs counted at the MAC layer may be determined based on a reference signal, such as the BFD-RS transmitted, at 408 in the call flow diagram 400, from the base station 404 to the UE 402. A trigger condition for recording BFIs may be based on a high BLER of the BFD-RS.

The MAC layer of the UE 452 may initiate, at 460, the timer when a first BFI is reported. The BFI count may be increased by 1 for each BFI that is reported from the PHY layer of the UE 452 to the MAC layer of the UE 452. If the BFI counts reaches a maxCount before the timer expires, a beam failure may be declared, at 468a, by the UE 452, which may initiate a BFR procedure, at 468b, based on the declared beam failure. If the BFI does not distinguish between BFI caused by decreased channel conditions and BFI caused by interference, the MAC layer may initiate the BFR procedure even if the BFI is associated with temporary interference.

Separate counting procedures for all BFI and consecutive BFI may allow the UE 452 to distinguish between interference-related BFI and channel quality-related BFI. For example, a small amount of consecutive BFI may be indicative of temporary interference, whereas non-consecutive BFI may be indicative of decreased channel quality. Thus, the UE 452 may perform two separate procedures for all BFI reporting and consecutive BFI reporting. For all BFI reporting, the BFI count may be increased by 1 whenever BFI is reported. However, for consecutive BFI reporting, where BFI may be reported at each BFD-RS occasion, the UE 452 may determine whether BFI is reported at each of the BFD-RS occasions. If BFI is determined at consecutive BFD-RS occasions, the BFI count for the consecutive BFI reporting procedure may be increased by 1. If the BFI is determined to be non-consecutive with other BFI, the BFI count for the consecutive BFI reporting procedure may not be incremented.

The counters for the separate BFI counting procedures may correspond to y_all and y_consecutive. Whenever BFI is reported, y_all may be increased by 1. Whenever consecutive BFI is reported, y_consecutive may be increase based on the amount of consecutive BFI. Separate counting procedures may reduce an impact of the BFI on the performance of the UE 452 when the consecutive BFI is small. For example, a small amount of consecutive BFI may correspond to temporary interference, which may be disregarded to reduce a number of BFD events that may impact the performance of the UE 452. However, an increased amount of consecutive BFI may correspond to a decreased channel quality.

An example counter for the consecutive BFI counting procedure may be based on:

$$y\_consecutive = \begin{cases} a*BFI\_count; & \text{if } BFI\_count < threshold\_consecutive \\ BFI\_count^b; & \text{if } BFI\_count \geq threshold\_consecutive \end{cases},$$

where a and b are constant, 0<a<1, and b>1. In cases where y_consecutive=a*BFI_count, the count may be increased slowly, since a<1 and multiple BFI may have to be reported to increase the counter by 1 count. In cases where y_consecutive=BFI_count$^b$, the count may be increased more rapidly (e.g., exponentially), since b>1, to reach the maxCount threshold faster and initiate BFR sooner. While the above-noted algorithm is provided as an example, y_consecutive may be based on additional or alternative algorithms, and is not limited to the above-noted algorithm.

Separate thresholds for the separate counting procedures may be configured based on maxCount and maxCount_consecutive. The counter associated with y_all may be compared to the maxCount_threshold, and the counter associated with y_consecutive may be compared to the maxCount_consecutive threshold. The maxCount_consecutive threshold may be adjusted (e.g., at 464) based on the amount of consecutive BFI, e.g., to reduce the impact of consecutive BFI on the performance of the UE 452 when the consecutive BFI is small, and to react to consecutive BFI quickly when the consecutive BFI is large. A small amount of consecutive BFI may correspond to temporary interference and a large amount of consecutive BFI may correspond to decreased channel quality and/or extended interference.

An example threshold for the consecutive BFI counting procedure may be based on:

$$\text{maxCount\_consecutive} = \begin{cases} C + a; \text{ if BFI\_count} < \text{threshold\_consecutive} \\ C - b; \text{ if BFI\_count} \geq \text{threshold\_consecutive} \end{cases},$$

where C is a current maxCount_consecutive threshold, and a and b are adjustable parameters. If the BFI_count<threshold_consecutive, C may be increased by a to allow more consecutive BFI to be reported before the threshold is reached. If the BFI_count≥threshold_consecutive, C may be decreased by b to reduce the impact/number of consecutive BFI in association with the threshold.

Another example threshold for the consecutive BFI counting procedure may be based on:

maxCount_consecutive =
$$\begin{cases} maxCount + a; \text{ if BFI\_count} < \text{threshold\_consecutive} \\ maxCount - b; \text{ if BFI\_count} \geq \text{threshold\_consecutive} \end{cases},$$

where maxCount_consecutive may be adjusted (e.g., at 464) based on a previous maxCount value, and a and b are adjustable parameters. The maxCount threshold may be changed dynamically by a or b based on the previous maxCount value. While the above-noted algorithms are provided as examples, maxCount_consecutive may be based on additional or alternative algorithms, and is not limited to the above-noted algorithms.

Separate timers may be used in association with the separate counters and the separate thresholds. The separate timers may correspond to timer_all and timer_consecutive. The timer_all may be initiated (e.g., at 460) when counter y_all begins to increase. The timer_consecutive may be initiated (e.g., at 460) when counter y_consecutive begins to increase. Counter y_all may be reset (e.g., at 470) when timer_all expires, and counter y_consecutive may be similarly reset (e.g., at 460) when non-consecutive BFI is reported or when timer_consecutive expires.

The timer_all and the timer_consecutive may correspond to the same or different values. If maxCount or maxCount_consecutive is reached before the corresponding timer expires, beam failure may be declared, at 468a, by the UE 452. If beam failure is declared, at 468a, based on y_all reaching the maxCount, the MAC layer may determine that a BFD event has occurred. If beam failure is declared, at 468a, based on y_consecutive reaching maxCount_consecutive, the MAC layer may determine that a BFD event has occurred in association with an interference-aware BFI reporting procedure.

Counter parameters may be configured for the counter y_all, the counter y_consecutive, and a function associated with y_consecutive. Threshold parameters may be configured for the maxCount threshold, the maxCount_consecutive threshold, and a function associated with maxCount_consecutive. Timer parameters may be configured for the timer_all, and the timer_consecutive. A configuration entity, such as the base station 464, may utilize an RRC configuration (e.g., via L3 signaling) to configure the parameters, at 456. In examples, the configured parameters may include a set of multiple values. If the multiple values of the parameter are configured, at 456, the base station 454 may use DCI or MAC-CE (e.g., L1/L2 signaling) to signal a change to the parameter values.

Figure 6:
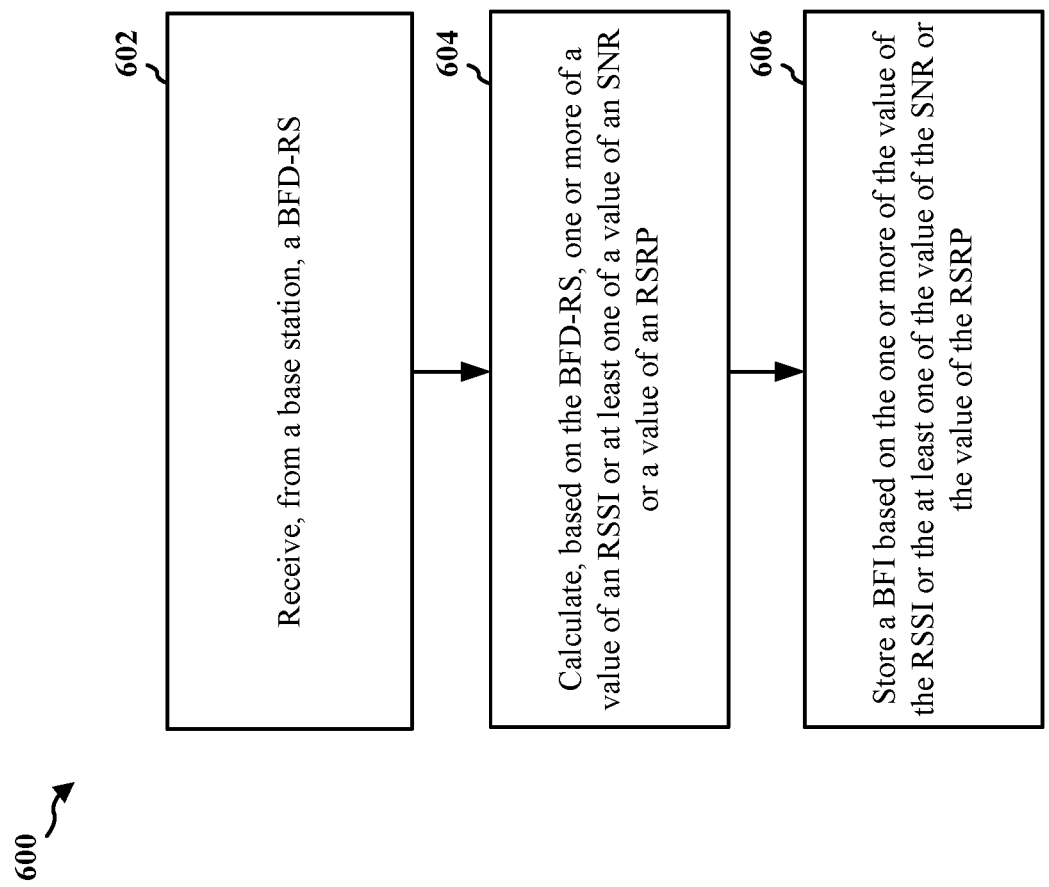
FIG. 6 is a flowchart of a method of wireless communication at a UE.

FIG. 6 is a flowchart 600 of a method of wireless communication. The method may be performed by a UE (e.g., the UE 104/402/452; the apparatus 1402; etc.), which may include the memory 360 and which may be the entire UE 104/402/452 or a component of the UE 104/402/452, such as the TX processor 368, the RX processor 356, and/or the controller/processor 359.

At 602, the UE may receive, from a base station, a BFD-RS. For example, referring to FIG. 4A, the UE 402 may receive, at 408, a BFD-RS from the base station 404. The reception, at 602, may be performed by the BFI reporting component 1440 of the apparatus 1402 in FIG. 14.

At 604, the UE may calculate, based on the BFD-RS, one or more of a value of an RSSI or at least one of a value of an SNR or a value of an RSRP. For example, referring to FIG. 4A, the UE 402 may calculate, at 412, an RSSI value, an SNR value, and/or an RSRP value based on the BFD-RS received, at 408, from the base station 404. The calculation, at 604, may be performed by the BFI reporting component 1440 of the apparatus 1402 in FIG. 14.

At 606, the UE may store a BFI based on the one or more of the value of the RSSI or the at least one of the value of the SNR or the value of the RSRP. For example, referring to FIGS. 4A and 5, the UE may store a BFI, at 416, based on either the PHY layer indicating the BFI to the MAC layer, or the PHY layer indicating information for the MAC layer to determine the BFI. The BFI and/or the BFI information indicated from the PHY layer to the MAC layer may be based on the comparison, at 414, performed by the UE 402. The diagram 500 illustrates SNR/RSRP values being compared to respective SNR/RSRP thresholds for determining whether to store a BFI. The diagram 550 further a value for an SNR/RSRP—a value for an RSSI being compared to respective SNR/RSRP difference thresholds for determining whether to store a BFI. The storing, at 606, may be performed by the BFI reporting component 1440 of the apparatus 1402 in FIG. 14.

Figure 7:
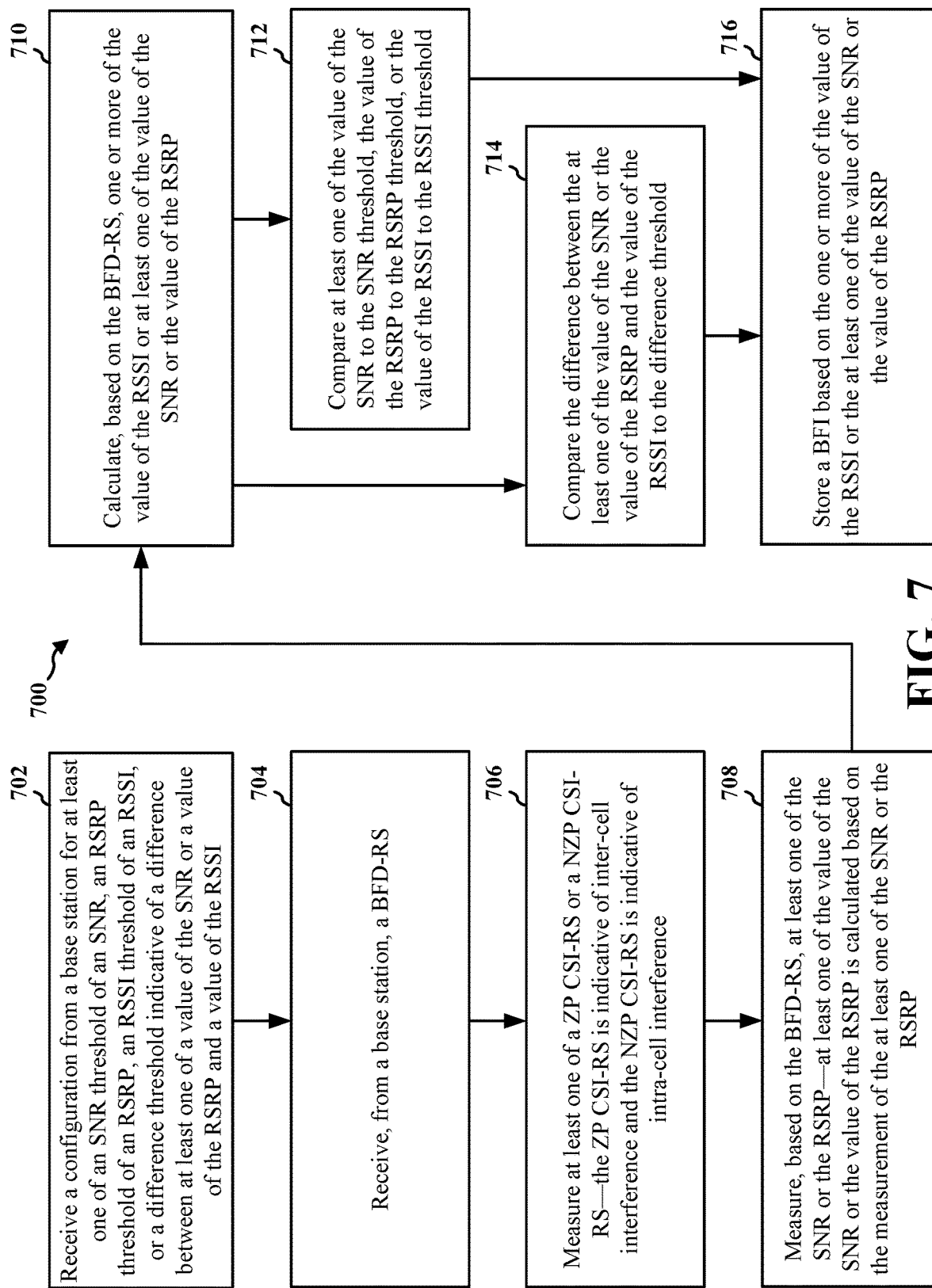
FIG. 7 is a flowchart of a method of wireless communication at a UE.

FIG. 7 is a flowchart 700 of a method of wireless communication. The method may be performed by a UE (e.g., the UE 104/402/452; the apparatus 1402; etc.), which may include the memory 360 and which may be the entire UE 104/402/452 or a component of the UE 104/402/452, such as the TX processor 368, the RX processor 356, and/or the controller/processor 359.

At 702, the UE may receive a configuration from a base station for at least one of an SNR threshold of an SNR, an RSRP threshold of an RSRP, an RSSI threshold of an RSSI, or a difference threshold indicative of a difference between at least one of a value of the SNR or a value of the RSRP and a value of the RSSI. For example, referring to FIG. 4A, the UE 402 may receive, at 406, a UE configuration from the base station 404. The UE configuration received, at 406, may be for an SNR threshold, an RSRP threshold, an RSSI threshold, and/or a difference threshold associated with a difference between an SNR/RSRP value and an RSSI value. The reception, at 702, may be performed by the BFI reporting component 1440 of the apparatus 1402 in FIG. 14.

At 704, the UE may receive, from a base station, a BFD-RS. For example, referring to FIG. 4A, the UE 402 may receive, at 408, a BFD-RS from the base station 404. The reception, at 704, may be performed by the BFI reporting component 1440 of the apparatus 1402 in FIG. 14.

At 706, the UE may measure at least one of a ZP CSI-RS or a NZP CSI-RS—the ZP CSI-RS is indicative of inter-cell interference and the NZP CSI-RS is indicative of intra-cell interference. For example, referring to FIG. 4A, the UE 402 may measure, at 410, ZP CSI-RS or NZP CSI-RS based on the UE configuration received, at 406, from the base station 404. The measurement, at 706, may be performed by the BFI reporting component 1440 of the apparatus 1402 in FIG. 14.

At 708, the UE may measure, based on the BFD-RS, at least one of the SNR or the RSRP—at least one of the value of the SNR or the value of the RSRP is calculated based on the measurement of the at least one of the SNR or the RSRP. For example, referring to FIG. 4A, the UE 402 may measure, at 410, SNR/RSRP based on the BFD-RS received, at 408, from the base station 404 to calculate, at 412, an RSSI value, an SNR value, and/or an RSRP value. The measurement, at 708, may be performed by the BFI reporting component 1440 of the apparatus 1402 in FIG. 14.

At 710, the UE may calculate, based on the BFD-RS, one or more of the value of the RSSI or at least one of the value of the SNR or the value of the RSRP. For example, referring to FIG. 4A, the UE 402 may calculate, at 412, an RSSI value, an SNR value, and/or an RSRP value based on the BFD-RS received, at 408, from the base station 404. The calculation, at 710, may be performed by the BFI reporting component 1440 of the apparatus 1402 in FIG. 14.

At 712, the UE may compare at least one of the value of the SNR to the SNR threshold, the value of the RSRP to the RSRP threshold, or the value of the RSSI to the RSSI threshold. For example, referring to FIGS. 4A and 5, the UE 402 may compare, at 414(1), SNR/RSRP to respective SNR/RSRP thresholds. The diagram 500 further illustrates SNR/RSRP values being compared to respective SNR/RSRP thresholds. For instance, BFI may be stored based on the diagram 500 when at least one of the value of the SNR is less than the SNR threshold or the value of the RSRP is less than the RSRP threshold, and when the value of the RSSI is less than the RSSI threshold. The comparison, at 712, may be performed by the BFI reporting component 1440 of the apparatus 1402 in FIG. 14.

At 714, the UE may compare the difference between the at least one of the value of the SNR or the value of the RSRP and the value of the RSSI to the difference threshold. For example, referring to FIGS. 4A and 5, the UE 402 may compare, at 414(2), SNR/RSRP—RSSI to respective SNR/RSRP difference thresholds. The diagram 550 further illustrates a value for an SNR/RSRP—a value for an RSSI being compared to respective SNR/RSRP difference thresholds. For instance, BFI may be stored based on the diagram 550 when the difference between the at least one of the value of the SNR or the value of the RSRP and the value of the RSSI is less than the difference threshold, and when the value of the RSSI is less than the RSSI threshold. The comparison, at 714, may be performed by the BFI reporting component 1440 of the apparatus 1402 in FIG. 14.

At 716, the UE may store a BFI based on the one or more of the value of the RSSI or the at least one of the value of the SNR or the value of the RSRP. For example, referring to FIGS. 4A and 5, the UE may store a BFI, at 416, based on either the PHY layer indicating the BFI to the MAC layer, or the PHY layer indicating information for the MAC layer to determine the BFI. The BFI and/or the BFI information indicated from the PHY layer to the MAC layer may be based on the comparison, at 414, performed by the UE 402. The diagram 500 illustrates SNR/RSRP values being compared to respective SNR/RSRP thresholds for determining whether to store a BFI. The diagram 550 further a value for an SNR/RSRP—a value for an RSSI being compared to respective SNR/RSRP difference thresholds for determining whether to store a BFI. The storing, at 716, may be performed by the BFI reporting component 1440 of the apparatus 1402 in FIG. 14.

Figure 8:
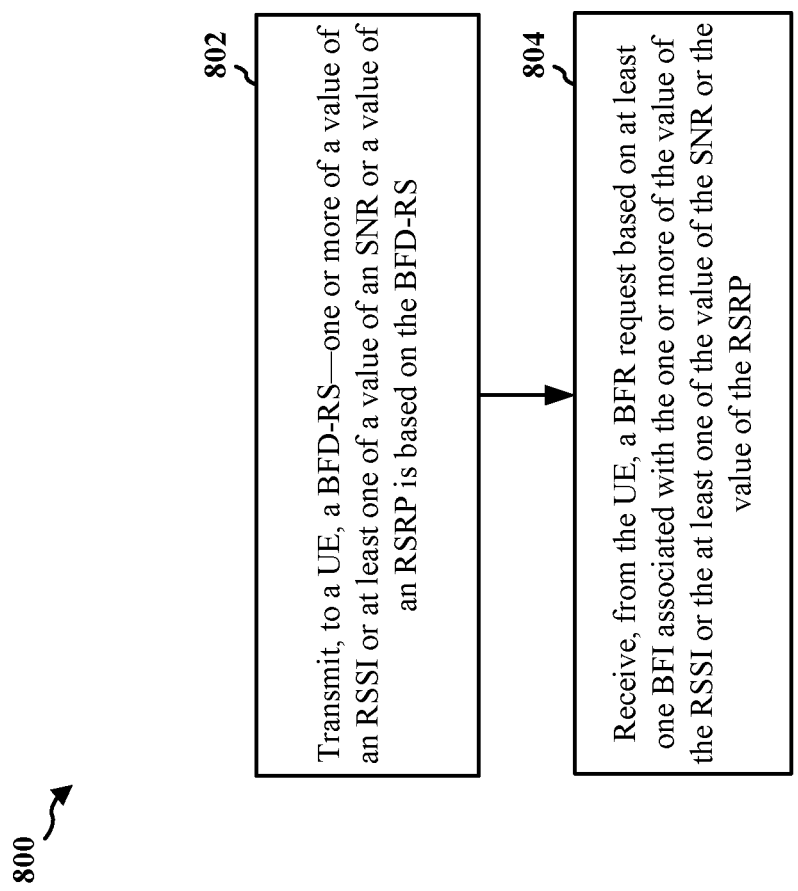
FIG. 8 is a flowchart of a method of wireless communication at a base station.

FIG. 8 is a flowchart 800 of a method of wireless communication. The method may be performed by a base station (e.g., the base station 102/404/454; the apparatus 1502; etc.), which may include the memory 376 and which may be the entire base station 102/404/454 or a component of the base station 102/404/454, such as the TX processor 316, the RX processor 370, and/or the controller/processor 375.

At 802, the base station may transmit, to a UE, a BFD-RS—one or more of a value of an RSSI or at least one of a value of an SNR or a value of an RSRP is based on the BFD-RS. For example, referring to FIG. 4A, the base station 404 may transmit, at 408, a BFD-RS to the UE 402 for the UE 402 to determine an RSSI value, an SNR value, and/or an RSRP value based on the BFD-RS. The transmission, at 802, may be performed by the BFR component 1540 of the apparatus 1502 in FIG. 15.

At 804, the base station may receive, from the UE, a BFR request based on at least one BFI associated with the one or more of the value of the RSSI or the at least one of the value of the SNR or the value of the RSRP. For example, referring to FIG. 4A, the base station 404 may receive, at 418, a BFR request from the UE 402, which may correspond to BFI stored, at 416, based on the comparison performed, at 414, in association with the RSSI value, the SNR value, and/or the RSRP value. The reception, at 804, may be performed by the BFR component 1540 of the apparatus 1502 in FIG. 15.

Figure 9:
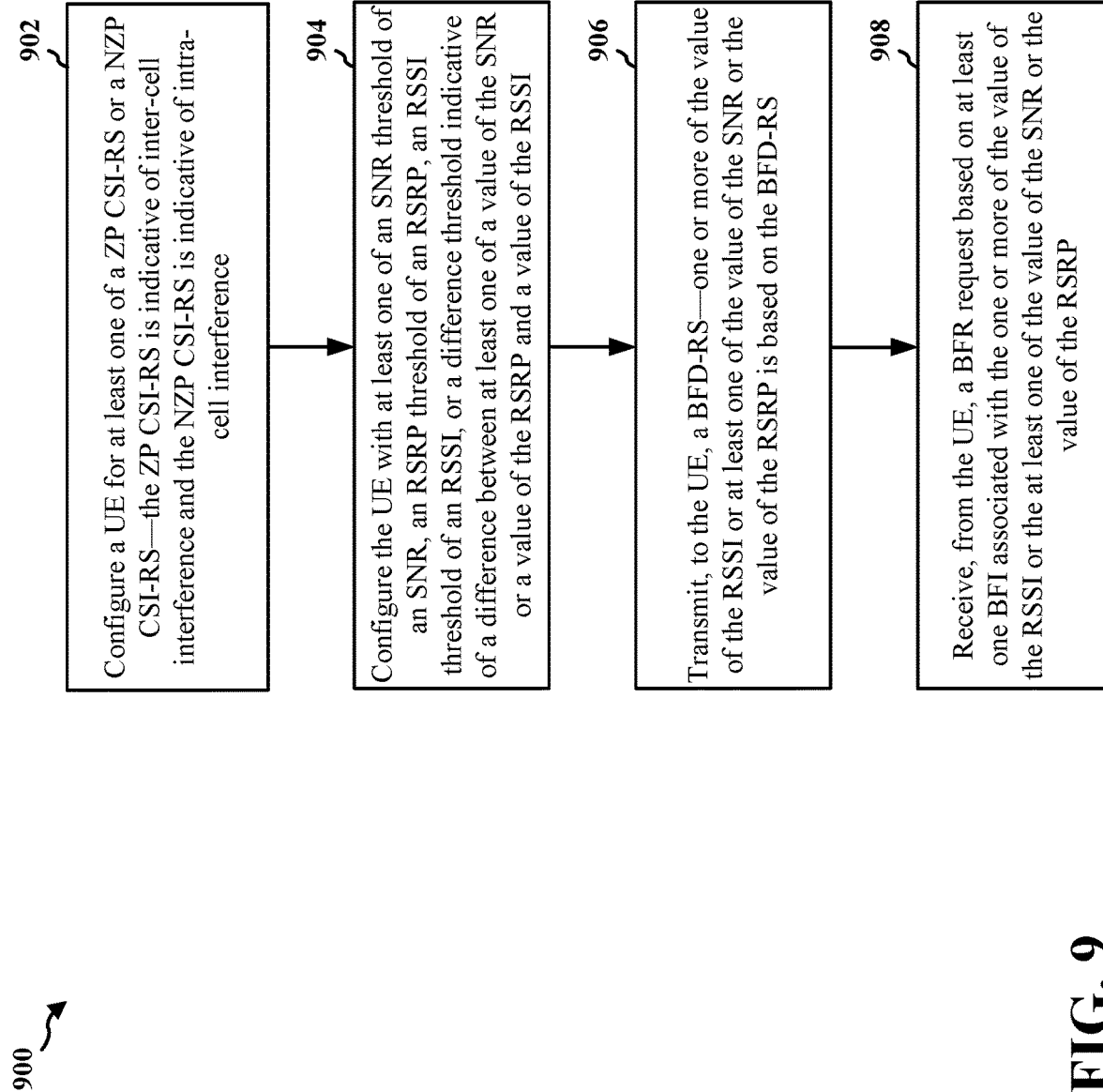
FIG. 9 is a flowchart of a method of wireless communication at a base station.

FIG. 9 is a flowchart 900 of a method of wireless communication. The method may be performed by a base station (e.g., the base station 102/404/454; the apparatus 1502; etc.), which may include the memory 376 and which may be the entire base station 102/404/454 or a component of the base station 102/404/454, such as the TX processor 316, the RX processor 370, and/or the controller/processor 375.

At 902, the base station may configure a UE for at least one of a ZP CSI-RS or a NZP CSI-RS—the ZP CSI-RS is indicative of inter-cell interference and the NZP CSI-RS is indicative of intra-cell interference. For example, referring to FIG. 4A, the base station 404 may configure, at 406, the UE 402 based on a UE configuration indicative of ZP CSI-RS and/or NZP CSI-RS. The configuration, at 902, may be performed by the BFR component 1540 of the apparatus 1502 in FIG. 15.

At 904, the base station may configure the UE with at least one of an SNR threshold of an SNR, an RSRP threshold of an RSRP, an RSSI threshold of an RSSI, or a difference threshold indicative of a difference between at least one of a value of the SNR or a value of the RSRP and a value of the RSSI. For example, referring to FIGS. 4A and 5, the base station 404 may configure, at 406, the UE 402 based on a UE configuration indicative of an SNR threshold, an RSRP threshold, an RSSI threshold, and/or a difference threshold associated with a difference between an SNR/RSRP value and an RSSI value. In the diagram 500, at least one of the value of the SNR may be compared to the SNR threshold, the value of the RSRP may be compared to the RSRP threshold, or the value of the RSSI may be compared to the RSSI threshold. The base station 404 may receive, at 418, a BFR request from the UE 402 based on at least one of the value of the SNR being less than the SNR threshold or the value of the RSRP being less than the RSRP threshold, and the value of the RSSI being less than the RSSI threshold (e.g., as illustrated in the diagram 500). In the diagram 550, the difference between the at least one of the value of the SNR or the value of the RSRP and the value of the RSSI may be compared to the difference threshold. The base station 404 may receive, at 418, the BFR request from the UE 402 based on the difference between the at least one of the value of the SNR or the value of the RSRP and the value of the RSSI being less than the difference threshold, and the value of the RSSI being less than the RSSI threshold (e.g., as illustrated in the diagram 550). The configuration, at 904, may be performed by the BFR component 1540 of the apparatus 1502 in FIG. 15.

At 906, the base station may transmit, to the UE, a BFD-RS—one or more of the value of the RSSI or at least one of the value of the SNR or the value of the RSRP is based on the BFD-RS. For example, referring to FIG. 4A, the base station 404 may transmit, at 408, a BFD-RS to the UE 402 for the UE 402 to determine an RSSI value, an SNR value, and/or an RSRP value based on the BFD-RS. At least one of the value of the SNR or the value of the RSRP may be measured, at 410, based on the BFD-RS transmitted, at 408, to the UE 402. The transmission, at 906, may be performed by the BFR component 1540 of the apparatus 1502 in FIG. 15.

At 908, the base station may receive, from the UE, a BFR request based on at least one BFI associated with the one or more of the value of the RSSI or the at least one of the value of the SNR or the value of the RSRP. For example, referring to FIG. 4A, the base station 404 may receive, at 418, a BFR request from the UE 402, which may correspond to BFI stored, at 416, based on the comparison performed, at 414, in association with the RSSI value, the SNR value, and/or the RSRP value. The reception, at 908, may be performed by the BFR component 1540 of the apparatus 1502 in FIG. 15.

Figure 10:
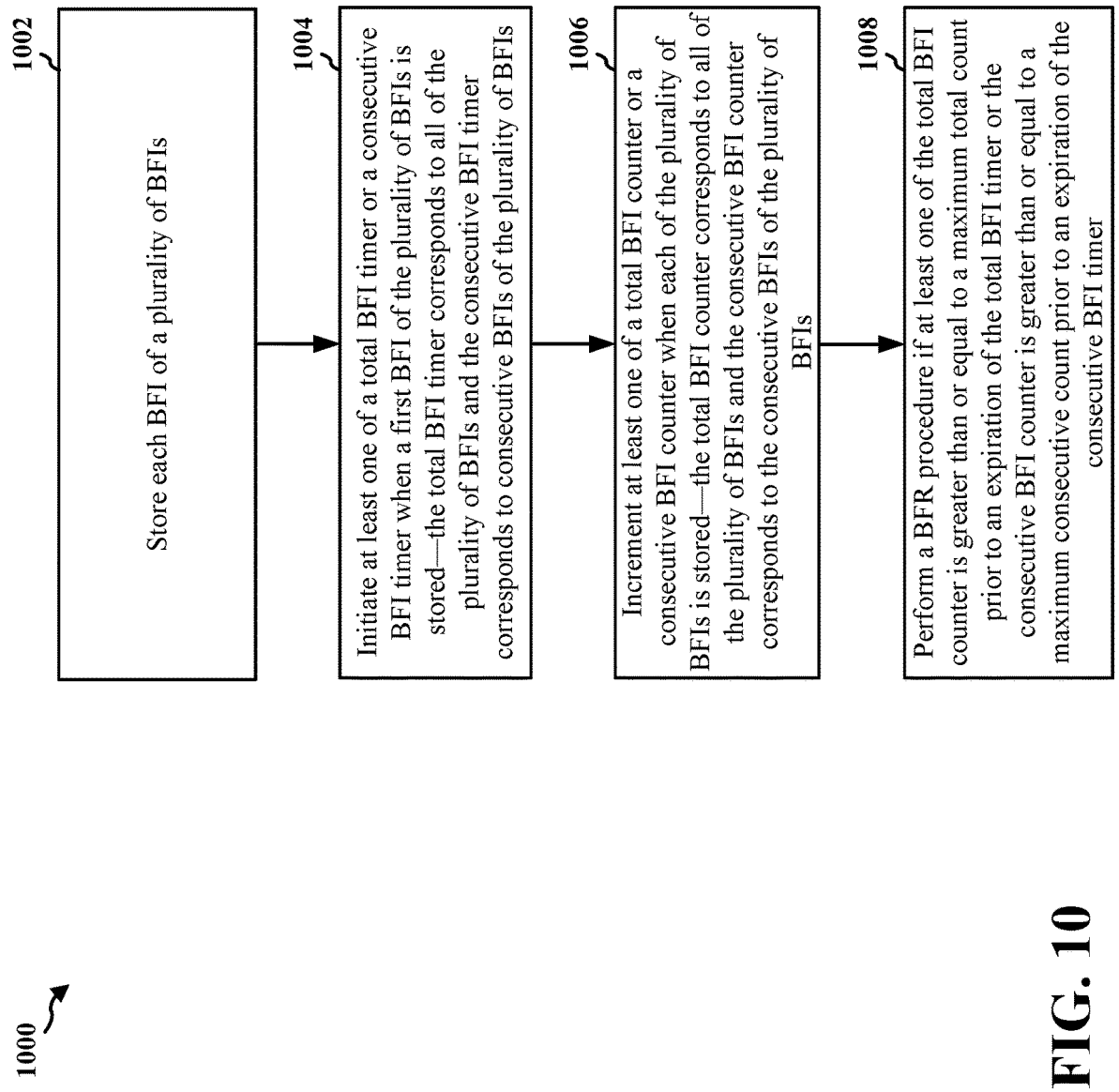
FIG. 10 is a flowchart of a method of wireless communication at a UE.

FIG. 10 is a flowchart 1000 of a method of wireless communication. The method may be performed by a UE (e.g., the UE 104/402/452; the apparatus 1402; etc.), which may include the memory 360 and which may be the entire UE 104/402/452 or a component of the UE 104/402/452, such as the TX processor 368, the RX processor 356, and/or the controller/processor 359.

At 1002, the UE may store each BFI of a plurality of BFIs. For example, referring to FIG. 4B, the UE 452 may store, at 458, each BFI of a plurality of BFIs. For instance, a BFI may be reported from the PHY layer to the MAC layer for the UE 452 to store the BFI, at 458. Alternatively, the PHY layer may indicate information to the MAC layer for the UE 452 to determine the BFI at the MAC layer and store the BFI, at 458. The storing, at 1002, may be performed by the BFI counter component 1442 of the apparatus 1402 in FIG. 14.

At 1004, the UE may initiate at least one of a total BFI timer or a consecutive BFI timer when a first BFI of the plurality of BFIs is stored—the total BFI timer corresponds to all of the plurality of BFIs and the consecutive BFI timer corresponds to consecutive BFIs of the plurality of BFIs. For example, referring to FIG. 4B, the UE 452 may initiate, at 460, total/consecutive BFI timer(s) after the UE 452 stores, at 458, the first BFI. The initiation, at 1004, may be performed by the BFI counter component 1442 of the apparatus 1402 in FIG. 14.

At 1006, the UE may increment at least one of a total BFI counter or a consecutive BFI counter when each of the plurality of BFIs is stored—the total BFI counter corresponds to all of the plurality of BFIs and the consecutive BFI counter corresponds to the consecutive BFIs of the plurality of BFIs. For example, referring to FIG. 4B, the UE 452 may increment, at 462, total/consecutive BFI counter(s) for each BFI that the UE 452 stores, at 458. The incrementing, at 1006, may be performed by the BFI counter component 1442 of the apparatus 1402 in FIG. 14.

At 1008, the UE may perform a BFR procedure if at least one of the total BFI counter is greater than or equal to a maximum total count prior to an expiration of the total BFI timer or the consecutive BFI counter is greater than or equal to a maximum consecutive count prior to an expiration of the consecutive BFI timer. For example, referring to FIG. 4B, the UE 452 may perform, at 468b, a BFR procedure with the base station 454. The BFR procedure may be performed, at 468b, based on the UE 452 determining, at 466, that a maximum total/consecutive count is exceeded (e.g., prior to an expiration of the total/consecutive BFI timer(s)). The performance, at 1008, may be performed by the BFI counter component 1442 of the apparatus 1402 in FIG. 14.

Figure 11:
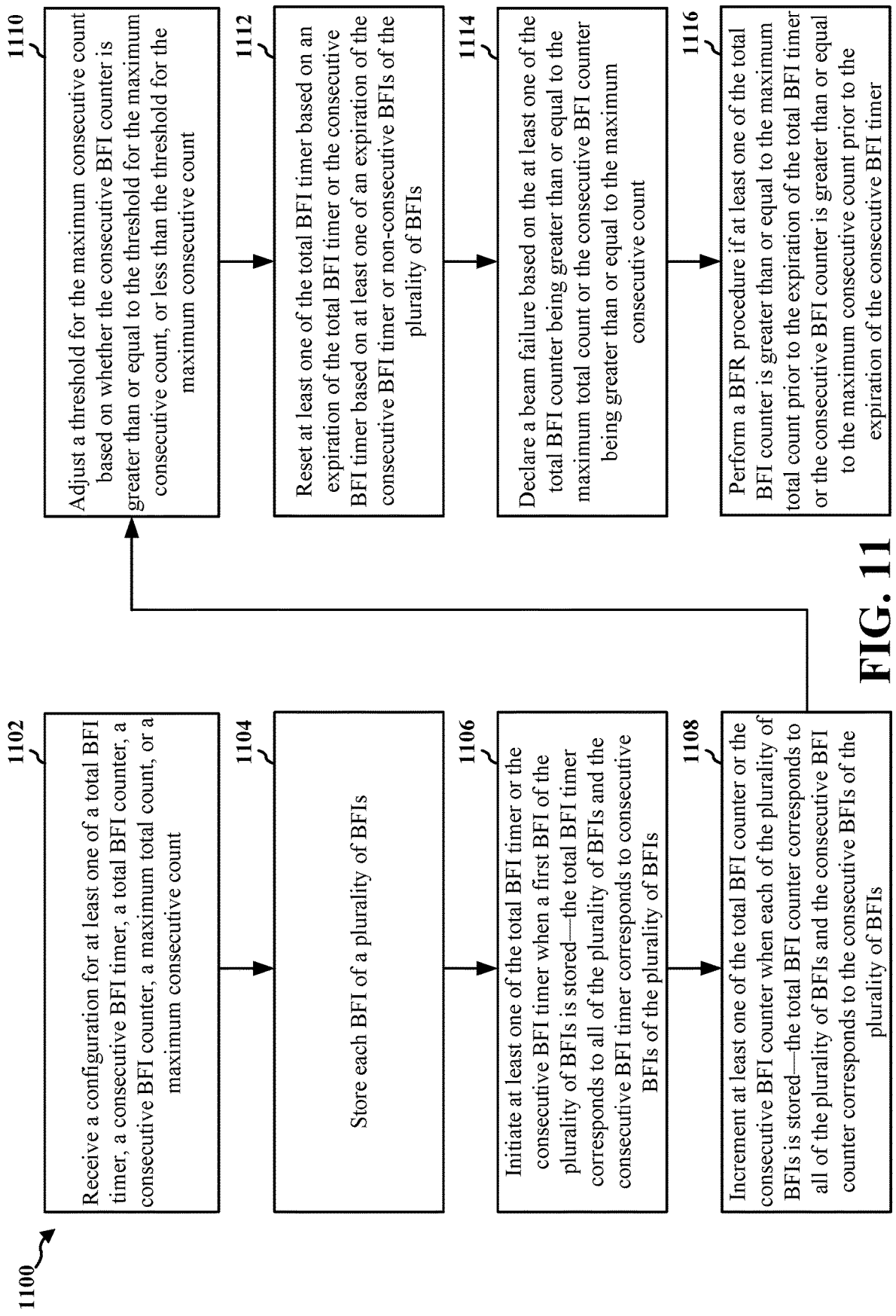
FIG. 11 is a flowchart of a method of wireless communication at a UE.

FIG. 11 is a flowchart 1100 of a method of wireless communication. The method may be performed by a UE (e.g., the UE 104/402/452; the apparatus 1402; etc.), which may include the memory 360 and which may be the entire UE 104/402/452 or a component of the UE 104/402/452, such as the TX processor 368, the RX processor 356, and/or the controller/processor 359.

At 1102, the UE may receive a configuration for at least one of a total BFI timer, a consecutive BFI timer, a total BFI counter, a consecutive BFI counter, a maximum total count, or a maximum consecutive count. For example, referring to FIG. 4B, the UE 452 may receive, at 456, a UE configuration from the base station 454. The UE configuration received, at 456, may correspond to total/consecutive BFI timers, total/consecutive BFI counters, and/or total/consecutive BFI maximum count thresholds. The reception, at 1102, may be performed by the BFI counter component 1442 of the apparatus 1402 in FIG. 14.

At 1104, the UE may store each BFI of a plurality of BFIs. For example, referring to FIG. 4B, the UE 452 may store, at 458, each BFI of a plurality of BFIs. For instance, a BFI may be reported from the PHY layer to the MAC layer for the UE 452 to store the BFI, at 458. Alternatively, the PHY layer may indicate information to the MAC layer for the UE 452 to determine the BFI at the MAC layer and store the BFI, at 458. That is, the BFI may be at least one of determined at the PHY layer and indicated to the MAC layer, or determined at the MAC layer based on information received from the PHY layer. The storing, at 1104, may be performed by the BFI counter component 1442 of the apparatus 1402 in FIG. 14.

At 1106, the UE may initiate at least one of the total BFI timer or the consecutive BFI timer when a first BFI of the plurality of BFIs is stored—the total BFI timer corresponds to all of the plurality of BFIs and the consecutive BFI timer corresponds to consecutive BFIs of the plurality of BFIs. For example, referring to FIG. 4B, the UE 452 may initiate, at 460, total/consecutive BFI timer(s) after the UE 452 stores, at 458, the first BFI. The initiation, at 1106, may be performed by the BFI counter component 1442 of the apparatus 1402 in FIG. 14.

At 1108, the UE may increment at least one of the total BFI counter or the consecutive BFI counter when each of the plurality of BFIs is stored—the total BFI counter corresponds to all of the plurality of BFIs and the consecutive BFI counter corresponds to the consecutive BFIs of the plurality of BFIs. For example, referring to FIG. 4B, the UE 452 may increment, at 462, total/consecutive BFI counter(s) for each BFI that the UE 452 stores, at 458. The consecutive BFI counter may be incremented, at 462, linearly if the consecutive BFI counter is less than the maximum consecutive count (e.g., configured at 456). Alternatively, the consecutive BFI counter may be incremented, at 462, exponentially if the consecutive BFI counter is greater than or equal to the maximum consecutive count (e.g., configured at 456). The incrementing, at 1108, may be performed by the BFI counter component 1442 of the apparatus 1402 in FIG. 14.

At 1110, the UE may adjust a threshold for the maximum consecutive count based on whether the consecutive BFI counter is greater than or equal to the threshold for the maximum consecutive count, or less than the threshold for the maximum consecutive count. For example, referring to FIG. 4B, the UE 452 may adjust, at 464, a threshold for the maximum consecutive count based on a current consecutive count. The adjustment, at 1110, may be performed by the BFI counter component 1442 of the apparatus 1402 in FIG. 14.

At 1112, the UE may reset at least one of the total BFI timer based on an expiration of the total BFI timer or the consecutive BFI timer based on at least one of an expiration of the consecutive BFI timer or non-consecutive BFIs of the plurality of BFIs. For example, referring to FIG. 4B, the UE 452 may reset, at 470, the total/consecutive BFI timer(s) based on an expiration of the total/consecutive BFI timer(s) or, for the consecutive BFI timer, based on non-consecutive BFI. The resetting, at 1112, may be performed by the BFI counter component 1442 of the apparatus 1402 in FIG. 14.

At 1114, the UE may declare a beam failure based on the at least one of the total BFI counter being greater than or equal to the maximum total count or the consecutive BFI counter being greater than or equal to the maximum consecutive count. For example, referring to FIG. 4B, the UE 452 may declare, at 468a, a beam failure based on determining, at 466, that a maximum total/consecutive count is exceeded (e.g., prior to an expiration of the total/consecutive BFI timer(s)). The declaration, at 1114, may be performed by the BFI counter component 1442 of the apparatus 1402 in FIG. 14.

At 1116, the UE may perform a BFR procedure if at least one of the total BFI counter is greater than or equal to the maximum total count prior to the expiration of the total BFI timer or the consecutive BFI counter is greater than or equal to the maximum consecutive count prior to the expiration of the consecutive BFI timer. For example, referring to FIG. 4B, the UE 452 may perform, at 468b, a BFR procedure with the base station 454. The BFR procedure may be performed, at 468b, based on the UE 452 determining, at 466, that a maximum total/consecutive count is exceeded (e.g., prior to an expiration of the total/consecutive BFI timer(s)). The performance, at 1116, may be performed by the BFI counter component 1442 of the apparatus 1402 in FIG. 14.

Figure 12:
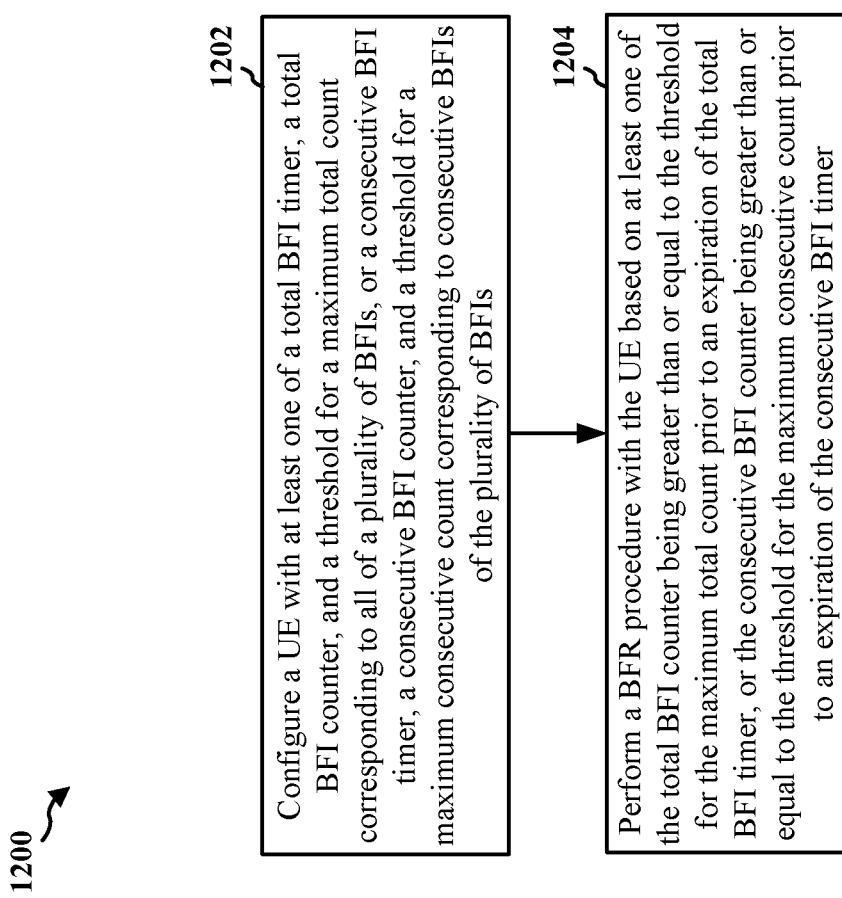
FIG. 12 is a flowchart of a method of wireless communication at a base station.

FIG. 12 is a flowchart 1200 of a method of wireless communication. The method may be performed by a base station (e.g., the base station 102/404/454; the apparatus 1502; etc.), which may include the memory 376 and which may be the entire base station 102/404/454 or a component of the base station 102/404/454, such as the TX processor 316, the RX processor 370, and/or the controller/processor 375.

At 1202, the base station may configure a UE with at least one of a total BFI timer, a total BFI counter, and a threshold for a maximum total count corresponding to all of a plurality of BFIs, or a consecutive BFI timer, a consecutive BFI counter, and a threshold for a maximum consecutive count corresponding to consecutive BFIs of the plurality of BFIs. For example, referring to FIG. 4B, the base station 454 may configure, at 456, the UE 452 with a UE configuration. The UE configuration configured, at 456, may correspond to total/consecutive BFI timers, total/consecutive BFI counters, and/or total/consecutive BFI maximum count thresholds. The configuration, at 1202, may be performed by the BFI configuration component 1542 of the apparatus 1502 in FIG. 15.

At 1204, the base station may perform a BFR procedure with the UE based on at least one of the total BFI counter being greater than or equal to the threshold for the maximum total count prior to an expiration of the total BFI timer, or the consecutive BFI counter being greater than or equal to the threshold for the maximum consecutive count prior to an expiration of the consecutive BFI timer. For example, referring to FIG. 4B, the base station 454 may perform, at 468b, a BFR procedure with the UE 452. The BFR procedure may be performed, at 468b, based on the BFR request received, at 468a, indicative of the maximum total/consecutive count being exceeded prior to an expiration of the total/consecutive BFI timer(s). The performance, at 1204, may be performed by the BFI configuration component 1542 of the apparatus 1502 in FIG. 15.

Figure 13:
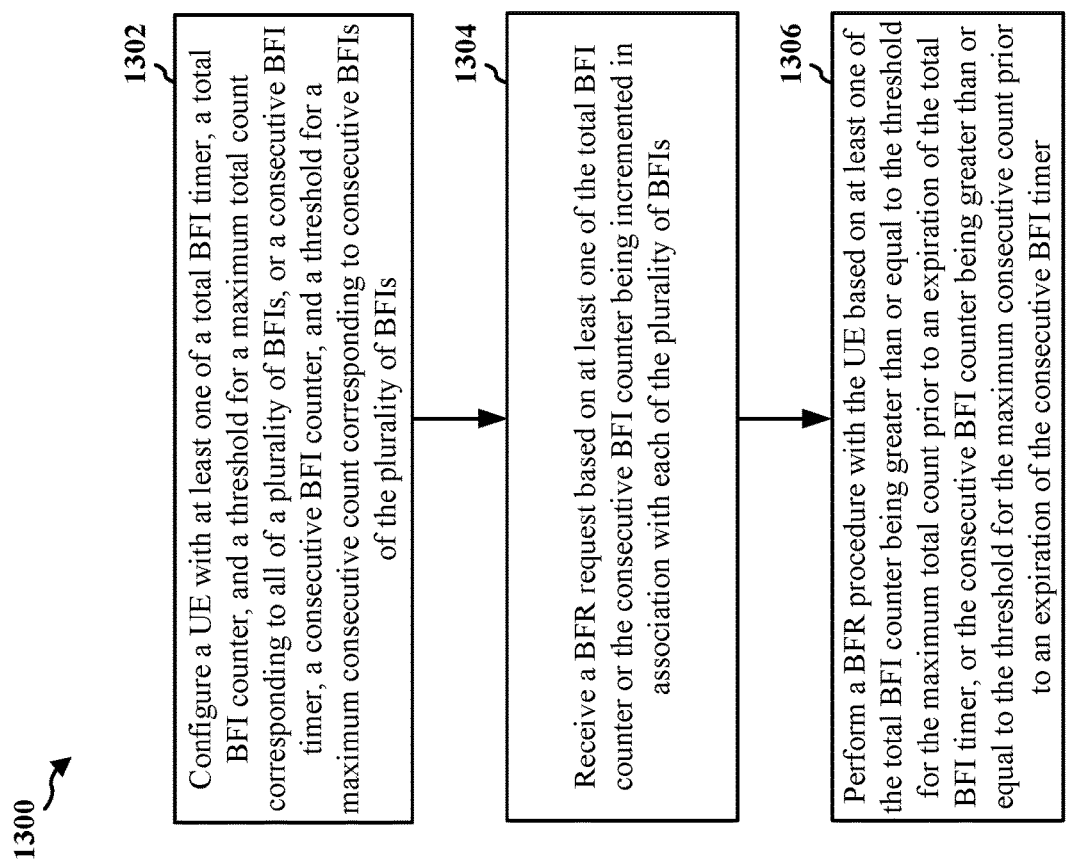
FIG. 13 is a flowchart of a method of wireless communication at a base station.

FIG. 13 is a flowchart 1300 of a method of wireless communication. The method may be performed by a base station (e.g., the base station 102/404/454; the apparatus 1502; etc.), which may include the memory 376 and which may be the entire base station 102/404/454 or a component of the base station 102/404/454, such as the TX processor 316, the RX processor 370, and/or the controller/processor 375.

At 1302, the base station may configure a UE with at least one of a total BFI timer, a total BFI counter, and a threshold for a maximum total count corresponding to all of a plurality of BFIs, or a consecutive BFI timer, a consecutive BFI counter, and a threshold for a maximum consecutive count corresponding to consecutive BFIs of the plurality of BFIs. For example, referring to FIG. 4B, the base station 454 may configure, at 456, the UE 452 with a UE configuration. The UE configuration configured, at 456, may correspond to total/consecutive BFI timers, total/consecutive BFI counters, and/or total/consecutive BFI maximum count thresholds. The BFI may be at least one of determined at the PHY layer and indicated to the MAC layer, or determined at the MAC layer based on information received from the PHY layer. The configuration, at 1302, may be performed by the BFI configuration component 1542 of the apparatus 1502 in FIG. 15.

At 1304, the base station may receive a BFR request based on at least one of the total BFI counter or the consecutive BFI counter being incremented in association with each of the plurality of BFIs. For example, referring to FIG. 4B, the base station 454 may receive, at 468a, a BFR request based on the incrementing, at 462, of the total/consecutive BFI counter(s). The consecutive BFI counter may be incremented linearly (e.g., at 462) if the consecutive BFI counter is less than the threshold for the maximum consecutive count. The consecutive BFI counter may be incremented exponentially (e.g., at 462) if the consecutive BFI counter is greater than or equal to the threshold for the maximum consecutive count. The reception, at 1304, may be performed by the BFI configuration component 1542 of the apparatus 1502 in FIG. 15.

At 1306, the base station may perform a BFR procedure with the UE based on at least one of the total BFI counter being greater than or equal to the threshold for the maximum total count prior to an expiration of the total BFI timer, or the consecutive BFI counter being greater than or equal to the threshold for the maximum consecutive count prior to an expiration of the consecutive BFI timer. For example, referring to FIG. 4B, the base station 454 may perform, at 468*b*, a BFR procedure with the UE 452. The BFR procedure may be performed, at 468*b*, based on the BFR request received, at 468*a*, indicative of the maximum total/consecutive count being exceeded prior to an expiration of the total/consecutive BFI timer(s). A beam failure may be declared (e.g., in association with the BFR request received at 468*a*) based on the at least one of the total BFI counter being greater than or equal to the threshold for the maximum total count or the consecutive BFI counter being greater than or equal to the threshold for the maximum consecutive count. The threshold for the maximum consecutive count may be adjusted (e.g., at 464) based on whether the consecutive BFI counter is greater than or equal to the threshold for the maximum consecutive count, or less than the threshold for the maximum consecutive count. At least one of the total BFI timer may be reset (e.g., at 470) based on the expiration of the total BFI timer, or the consecutive BFI timer may be reset (e.g., at 470) based on at least one of the expiration of the consecutive BFI timer or non-consecutive BFIs of the plurality of BFIs. The performance, at 1306, may be performed by the BFI configuration component 1542 of the apparatus 1502 in FIG. 15.

Figure 14:
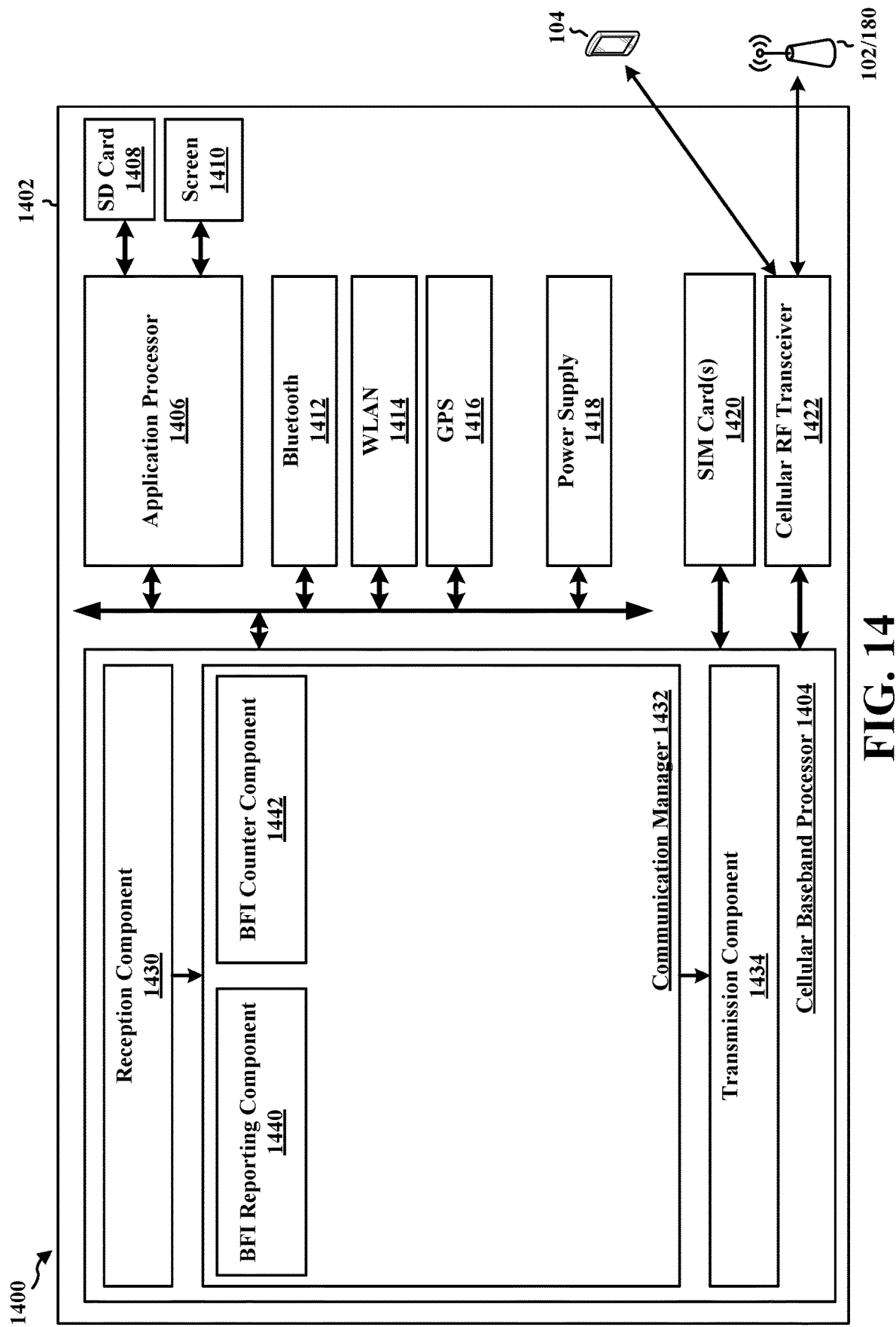
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a BFI reporting component 1440 that is configured, e.g., as described in connection with 602-606 and 702-716, to receive a configuration from a base station for at least one of an SNR threshold of an SNR, an RSRP threshold of an RSRP, an RSSI threshold of an RSSI, or a difference threshold indicative of a difference between at least one of a value of the SNR or a value of the RSRP and a value of the RSSI; to receive, from a base station, a BFD-RS; to measure at least one of a ZP CSI-RS or a NZP CSI-RS—the ZP CSI-RS is indicative of inter-cell interference and the NZP CSI-RS is indicative of intra-cell interference; to measure, based on the BFD-RS, at least one of the SNR or the RSRP—at least one of the value of the SNR or the value of the RSRP is calculated based on the measurement of the at least one of the SNR or the RSRP; to calculate, based on the BFD-RS, one or more of the value of the RSSI or at least one of the value of the SNR or the value of the RSRP; to compare at least one of the value of the SNR to the SNR threshold, the value of the RSRP to the RSRP threshold, or the value of the RSSI to the RSSI threshold; to compare the difference between the at least one of the value of the SNR or the value of the RSRP and the value of the RSSI to the difference threshold; and to store a BFI based on the one or more of the value of the RSSI or the at least one of the value of the SNR or the value of the RSRP.

The communication manager 1432 further includes a BFI counter component 1442 that is configured, e.g., as described in connection with 1002-1008 and 1102-1116, to receive a configuration for at least one of a total BFI timer, a consecutive BFI timer, a total BFI counter, a consecutive BFI counter, a maximum total count, or a maximum consecutive count; to store each BFI of a plurality of BFIs; to initiate at least one of the total BFI timer or the consecutive BFI timer when a first BFI of the plurality of BFIs is stored—the total BFI timer corresponds to all of the plurality of BFIs and the consecutive BFI timer corresponds to consecutive BFIs of the plurality of BFIs; to increment at least one of the total BFI counter or the consecutive BFI counter when each of the plurality of BFIs is stored—the total BFI counter corresponds to all of the plurality of BFIs and the consecutive BFI counter corresponds to the consecutive BFIs of the plurality of BFIs; to adjust a threshold for the maximum consecutive count based on whether the consecutive BFI counter is greater than or equal to the threshold for the maximum consecutive count, or less than the threshold for the maximum consecutive count; to reset at least one of the total BFI timer based on an expiration of the total BFI timer or the consecutive BFI timer based on at least one of an expiration of the consecutive BFI timer or non-consecutive BFIs of the plurality of BFIs; to declare a beam failure based on the at least one of the total BFI counter being greater than or equal to the maximum total count or the consecutive BFI counter being greater than or equal to the maximum consecutive count; and to perform a BFR procedure if at least one of the total BFI counter is greater than or equal to the maximum total count prior to the expiration of the total BFI timer or the consecutive BFI counter is greater than or equal to the maximum consecutive count prior to the expiration of the consecutive BFI timer.

The apparatus may include additional components that perform each of the blocks of the algorithm in the flowcharts of FIGS. 6-7 and 10-11. As such, each block in the flowcharts of FIGS. 6-7 and 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from a base station, a BFD-RS; means for calculating, based on the BFD-RS, one or more of a value of a RSSI or at least one of a value of an SNR or a value of an RSRP; and means for storing a BFI based on the one or more of the value of the RSSI or the at least one of the value of the SNR or the value of the RSRP. The apparatus 1402 further includes means for measuring, based on the BFD-RS, at least one of the SNR or the RSRP, where the at least one of the value of the SNR or the value of the RSRP is calculated based on the measurement of the at least one of the SNR or the RSRP. The apparatus 1402 further includes means for receiving a configuration from the base station for at least one of an SNR threshold of the SNR, an RSRP threshold of the RSRP, an RSSI threshold of the RSSI, or a difference threshold indicative of a difference between the at least one of the value of the SNR or the value of the RSRP and the value of the RSSI. The apparatus 1402 further includes means for comparing at least one of the value of the SNR to the SNR threshold, the value of the RSRP to the RSRP threshold, or the value of the RSSI to the RSSI threshold. The apparatus 1402 further includes means for comparing the difference between the at least one of the value of the SNR or the value of the RSRP and the value of the RSSI to the difference threshold. The apparatus 1402 further includes means for measuring at least one of a ZP CSI-RS or a NZP CSI-RS, the ZP CSI-RS indicative of inter-cell interference, the NZP CSI-RS indicative of intra-cell interference.

In further aspects, the apparatus 1402 further includes means for storing each BFI of a plurality of BFIs; means for initiating at least one of a total BFI timer or a consecutive BFI timer when a first BFI of the plurality of BFIs is stored, the total BFI timer corresponding to all of the plurality of BFIs, the consecutive BFI timer corresponding to consecutive BFIs of the plurality of BFIs; means for incrementing at least one of a total BFI counter or a consecutive BFI counter when each of the plurality of BFIs is stored, the total BFI counter corresponding to all of the plurality of BFIs, the consecutive BFI counter corresponding to the consecutive BFIs of the plurality of BFIs; and means for performing a BFR procedure if at least one of the total BFI counter is greater than or equal to a maximum total count prior to an expiration of the total BFI timer or the consecutive BFI counter is greater than or equal to a maximum consecutive count prior to an expiration of the consecutive BFI timer. The apparatus 1402 further includes means for declaring a beam failure based on the at least one of the total BFI counter being greater than or equal to the maximum total count or the consecutive BFI counter being greater than or equal to the maximum consecutive count. The apparatus 1402 further includes means for adjusting a threshold for the maximum consecutive count based on whether the consecutive BFI counter is greater than or equal to the threshold for the maximum consecutive count, or less than the threshold for the maximum consecutive count. The apparatus 1402 further includes means for resetting at least one of the total BFI timer based on the expiration of the total BFI timer or the consecutive BFI timer based on at least one of the expiration of the consecutive BFI timer or non-consecutive BFIs of the plurality of BFIs. The apparatus 1402 further includes means for receiving a configuration for at least one of the total BFI timer, the consecutive BFI timer, the total BFI counter, the consecutive BFI counter, the maximum total count, or the maximum consecutive count.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
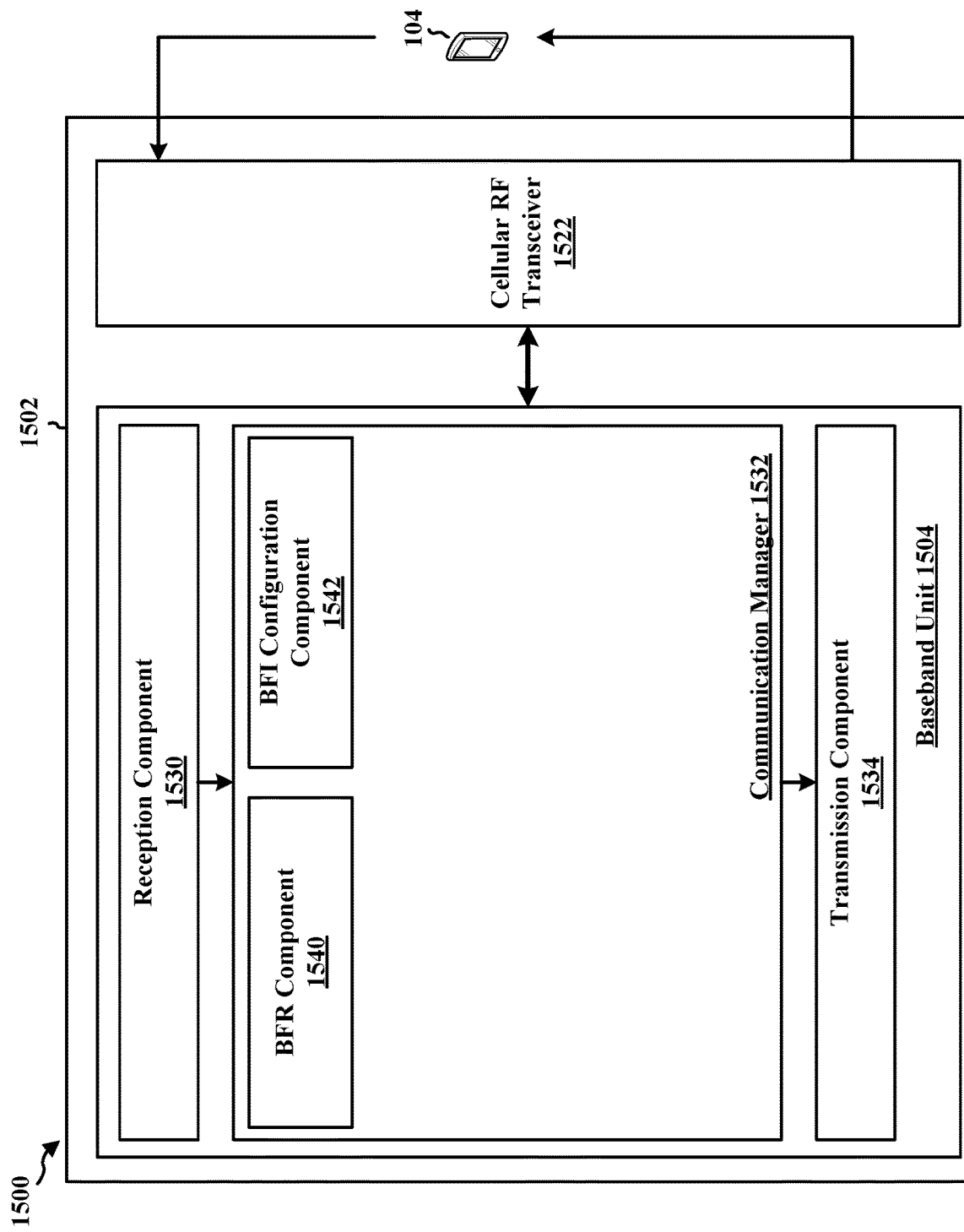
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a BFR component 1540 is configured, e.g., as described in connection with 802-804 and 902-908, to configure a UE for at least one of a ZP CSI-RS or a NZP CSI-RS—the ZP CSI-RS is indicative of inter-cell interference and the NZP CSI-RS is indicative of intra-cell interference; to configure the UE with at least one of an SNR threshold of an SNR, an RSRP threshold of an RSRP, an RSSI threshold of an RSSI, or a difference threshold indicative of a difference between at least one of a value of the SNR or a value of the RSRP and a value of the RSSI; to transmit, to the UE, a BFD-RS—one or more of the value of the RSSI or at least one of the value of the SNR or the value of the RSRP is based on the BFD-RS; and to receive, from the UE, a BFR request based on at least one BFI associated with the one or more of the value of the RSSI or the at least one of the value of the SNR or the value of the RSRP.

The communication manager 1532 further includes a BFI configuration component 1542 that is configured, e.g., as described in connection with 1202-1204 and 1302-1306, to configure a UE with at least one of a total BFI timer, a total BFI counter, and a threshold for a maximum total count corresponding to all of a plurality of BFIs, or a consecutive BFI timer, a consecutive BFI counter, and a threshold for a maximum consecutive count corresponding to consecutive BFIs of the plurality of BFIs; to receive a BFR request based on at least one of the total BFI counter or the consecutive BFI counter being incremented in association with each of the plurality of BFIs; and to perform a BFR procedure with the UE based on at least one of the total BFI counter being greater than or equal to the threshold for the maximum total count prior to an expiration of the total BFI timer, or the consecutive BFI counter being greater than or equal to the threshold for the maximum consecutive count prior to an expiration of the consecutive BFI timer.

The apparatus may include additional components that perform each of the blocks of the algorithm in the flowcharts of FIGS. 8-9 and 12-13. As such, each block in the flowcharts of FIGS. 8-9 and 12-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to a UE, a BFD-RS, one or more of a value of an RSSI or at least one of a value of an SNR or a value of an RSRP being based on the BFD-RS; and means for receiving, from the UE, a BFR request based on at least one BFI associated with the one or more of the value of the RSSI or the at least one of the value of the SNR or the value of the RSRP. The 1502 further includes means for configuring the UE with at least one of an SNR threshold of the SNR, an RSRP threshold of the RSRP, an RSSI threshold of the RSSI, or a difference threshold indicative of a difference between the at least one of the value of the SNR or the value of the RSRP and the value of the RSSI. The 1502 further includes means for configuring the UE for at least one of a ZP CSI-RS or a NZP CSI-RS, the ZP CSI-RS indicative of inter-cell interference, the NZP CSI-RS indicative of intra-cell interference.

In further aspects, the apparatus 1502 includes means for configuring a user equipment (UE) with at least one of a total beam failure indicator (BFI) timer, a total BFI counter, and a threshold for a maximum total count corresponding to all of a plurality of BFIs, or a consecutive BFI timer, a consecutive BFI counter, and a threshold for a maximum consecutive count corresponding to consecutive BFIs of the plurality of BFIs; and means for performing a BFR procedure with the UE based on at least one of the total BFI counter being greater than or equal to the threshold for the maximum total count prior to an expiration of the total BFI timer, or the consecutive BFI counter being greater than or equal to the threshold for the maximum consecutive count prior to an expiration of the consecutive BFI timer. The apparatus 1502 further includes means for receiving a BFR request based on at least one of the total BFI counter or the consecutive BFI counter being incremented in association with each of the plurality of BFIs.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, a BFD-RS; calculate, based on the BFD-RS, one or more of a value of an RSSI or at least one of a value of an SNR or a value of an RSRP; and store a BFI based on the one or more of the value of the RSSI or the at least one of the value of the SNR or the value of the RSRP.

Aspect 2 may be combined with aspect 1 and includes that the at least one processor is further configured to measure, based on the BFD-RS, at least one of the SNR or the RSRP, where the at least one of the value of the SNR or the value of the RSRP is calculated based on the measurement of the at least one of the SNR or the RSRP.

Aspect 3 may be combined with any of aspects 1-2 and includes that the at least one processor is further configured to receive a configuration from the base station for at least one of an SNR threshold of the SNR, an RSRP threshold of the RSRP, an RSSI threshold of the RSSI, or a difference threshold indicative of a difference between the at least one of the value of the SNR or the value of the RSRP and the value of the RSSI.

Aspect 4 may be combined with any of aspects 1-3 and includes that the at least one processor is further configured to compare at least one of the value of the SNR to the SNR threshold, the value of the RSRP to the RSRP threshold, or the value of the RSSI to the RSSI threshold.

Aspect 5 may be combined with any of aspects 1-4 and includes that the BFI is stored when at least one of the value of the SNR is less than the SNR threshold or the value of the RSRP is less than the RSRP threshold, and when the value of the RSSI is less than the RSSI threshold.

Aspect 6 may be combined with any of aspects 1-3 and includes that the at least one processor is further configured to compare the difference between the at least one of the value of the SNR or the value of the RSRP and the value of the RSSI to the difference threshold.

Aspect 7 may be combined with any of aspects 1-3 or 6 and includes that the BFI is stored when the difference between the at least one of the value of the SNR or the value of the RSRP and the value of the RSSI is less than the difference threshold, and when the value of the RSSI is less than the RSSI threshold.

Aspect 8 may be combined with any of aspects 1-7 and includes that the at least one processor is further configured to measure at least one of a ZP CSI-RS or a NZP CSI-RS, the ZP CSI-RS indicative of inter-cell interference, the NZP CSI-RS indicative of intra-cell interference.

Aspect 9 is an apparatus for wireless communication at a base station including at least one processor coupled to a memory and configured to transmit, to a UE, a BFD-RS, one or more of a value of an RSSI or at least one of a value of an SNR or a value of an RSRP being based on the BFD-RS; and receive, from the UE, a BFR request based on at least one BFI associated with the one or more of the value of the RSSI or the at least one of the value of the SNR or the value of the RSRP.

Aspect 10 may be combined with aspect 9 and includes that the at least one of the value of the SNR or the value of the RSRP is measured based on the BFD-RS transmitted to the UE.

Aspect 11 may be combined with any of aspects 9-10 and includes that the at least one processor is further configured to configure the UE with at least one of an SNR threshold of the SNR, an RSRP threshold of the RSRP, an RSSI threshold of the RSSI, or a difference threshold indicative of a difference between the at least one of the value of the SNR or the value of the RSRP and the value of the RSSI.

Aspect 12 may be combined with any of aspects 9-11 and includes that at least one of the value of the SNR is compared to the SNR threshold, the value of the RSRP is compared to the RSRP threshold, or the value of the RSSI is compared to the RSSI threshold.

Aspect 13 may be combined with any of aspects 9-12 and includes that the BFR request is received from the UE based on at least one of the value of the SNR being less than the SNR threshold or the value of the RSRP being less than the RSRP threshold, and the value of the RSSI being less than the RSSI threshold.

Aspect 14 may be combined with any of aspects 9-11 and includes that the difference between the at least one of the value of the SNR or the value of the RSRP and the value of the RSSI is compared to the difference threshold.

Aspect 15 may be combined with any of aspects 9-11 or 14 and includes that the BFR request is received from the UE based on the difference between the at least one of the value of the SNR or the value of the RSRP and the value of the RSSI being less than the difference threshold, and the value of the RSSI being less than the RSSI threshold.

Aspect 16 may be combined with any of aspects 9-15 and includes that the at least one processor is further configured to measure at least one of a ZP CSI-RS or a NZP CSI-RS, the ZP CSI-RS indicative of inter-cell interference, the NZP CSI-RS indicative of intra-cell interference.

Aspect 17 is an apparatus for wireless communication at a UE including at least one processor coupled to a memory and configured to store each BFI of a plurality of BFIs; initiate at least one of a total BFI timer or a consecutive BFI timer when a first BFI of the plurality of BFIs is stored, the total BFI timer corresponding to all of the plurality of BFIs, the consecutive BFI timer corresponding to consecutive BFIs of the plurality of BFIs; increment at least one of a total BFI counter or a consecutive BFI counter when each of the plurality of BFIs is stored, the total BFI counter corresponding to all of the plurality of BFIs, the consecutive BFI counter corresponding to the consecutive BFIs of the plurality of BFIs; and perform a BFR procedure if at least one of the total BFI counter is greater than or equal to a maximum total count prior to an expiration of the total BFI timer or the consecutive BFI counter is greater than or equal to a maximum consecutive count prior to an expiration of the consecutive BFI timer.

Aspect 18 may be combined with aspect 17 and includes that the at least one processor is further configured to declare a beam failure based on the at least one of the total BFI counter being greater than or equal to the maximum total count or the consecutive BFI counter being greater than or equal to the maximum consecutive count.

Aspect 19 may be combined with any of aspects 17-18 and includes that the consecutive BFI counter is incremented linearly if the consecutive BFI counter is less than the maximum consecutive count, and where the consecutive BFI counter is incremented exponentially if the consecutive BFI counter is greater than or equal to the maximum consecutive count.

Aspect 20 may be combined with any of aspects 17-19 and includes that the at least one processor is further configured to adjust a threshold for the maximum consecutive count based on whether the consecutive BFI counter is greater than or equal to the threshold for the maximum consecutive count, or less than the threshold for the maximum consecutive count.

Aspect 21 may be combined with any of aspects 17-20 and includes that the at least one processor is further configured to reset at least one of the total BFI timer based on the expiration of the total BFI timer or the consecutive BFI timer based on at least one of the expiration of the consecutive BFI timer or non-consecutive BFIs of the plurality of BFIs.

Aspect 22 may be combined with any of aspects 17-21 and includes that the at least one processor is further configured to receive a configuration for at least one of the total BFI timer, the consecutive BFI timer, the total BFI counter, the consecutive BFI counter, the maximum total count, or the maximum consecutive count.

Aspect 23 may be combined with any of aspects 17-22 and includes that the BFI is at least one of determined at a PHY layer and indicated to a MAC layer, or determined at the MAC layer based on information received from the PHY layer.

Aspect 24 is an apparatus for wireless communication at a base station including at least one processor coupled to a memory and configured to configure a UE with at least one of a total BFI timer, a total BFI counter, and a threshold for a maximum total count corresponding to all of a plurality of BFIs, or a consecutive BFI timer, a consecutive BFI counter, and a threshold for a maximum consecutive count corresponding to consecutive BFIs of the plurality of BFIs; and perform a BFR procedure with the UE based on at least one of the total BFI counter being greater than or equal to the threshold for the maximum total count prior to an expiration of the total BFI timer, or the consecutive BFI counter being greater than or equal to the threshold for the maximum consecutive count prior to an expiration of the consecutive BFI timer.

Aspect 25 may be combined with aspect 24 and includes that a beam failure is declared based on the at least one of the total BFI counter being greater than or equal to the threshold for the maximum total count or the consecutive BFI counter being greater than or equal to the threshold for the maximum consecutive count.

Aspect 26 may be combined with any of aspects 24-25 and includes that the at least one processor is further configured to receive a BFR request based on at least one of the total BFI counter or the consecutive BFI counter being incremented in association with each of the plurality of BFIs.

Aspect 27 may be combined with any of aspects 24-26 and includes that the consecutive BFI counter is incremented linearly if the consecutive BFI counter is less than the threshold for the maximum consecutive count, and where the consecutive BFI counter is incremented exponentially if the consecutive BFI counter is greater than or equal to the threshold for the maximum consecutive count.

Aspect 28 may be combined with any of aspects 24-27 and includes that the threshold for the maximum consecutive count is adjusted based on whether the consecutive BFI counter is greater than or equal to the threshold for the maximum consecutive count, or less than the threshold for the maximum consecutive count.

Aspect 29 may be combined with any of aspects 24-28 and includes that at least one of the total BFI timer is reset based on the expiration of the total BFI timer, or the consecutive BFI timer is reset based on at least one of the expiration of the consecutive BFI timer or non-consecutive BFIs of the plurality of BFIs.

Aspect 30 may be combined with any of aspects 24-29 and includes that the BFI is at least one of determined at a PHY layer and indicated to a MAC layer, or determined at the MAC layer based on information received from the PHY layer.

Aspect 31 may be combined with any of aspect 1-30 and further includes a transceiver coupled to the at least one processor.

Aspect 32 is a method of wireless communication for implementing any of aspects 1-31.

Aspect 33 is an apparatus for wireless communication including means for implementing any of aspects 1-31.

Aspect 34 is a computer-readable medium storing computer executable code, the code when executed by at least one processor causes the at least one processor to implement any of aspects 1-31.

What is claimed is:

1. An apparatus for wireless communication at a user equipment (UE), comprising:
   a memory; and
   at least one processor coupled to the memory and configured to:
   receive, from a base station, a beam failure detection-reference signal (BFD-RS);
   calculate, based on the BFD-RS, one or more of a value of a received signal strength indicator (RSSI) or at least one of a value of a signal-to-noise ratio (SNR) or a value of a reference signal received power (RSRP);
   compare at least one of the value of the SNR to a SNR threshold, the value of the RSRP to a RSRP threshold, or the value of the RSSI to a RSSI threshold; and
   store a beam failure indicator (BFI) when at least one of the value of the SNR is less than the SNR threshold or the value of the RSRP is less than the RSRP threshold, and when the value of the RSSI is less than the RSSI threshold.

2. The apparatus of claim 1, wherein the at least one processor is further configured to measure, based on the BFD-RS, at least one of the SNR or the RSRP, wherein to calculate the at least one of the value of the SNR or the value of the RSRP, the at least one processor is configured to calculate the at least one of the value of the SNR or the value of the RSRP based on the measurement of the at least one of the SNR or the RSRP.

3. The apparatus of claim 1, wherein the at least one processor is further configured to receive a configuration from the base station for at least one of the SNR threshold of the SNR, the RSRP threshold of the RSRP, the RSSI threshold of the RSSI, or a difference threshold corresponding to the at least one of the value of the SNR or the value of the RSRP and the value of the RSSI.

4. The apparatus of claim 3, wherein the at least one processor is further configured to compare a difference between the at least one of the value of the SNR or the value of the RSRP and the value of the RSSI to the difference threshold.

5. The apparatus of claim 4, wherein to store the BFI, the at least one processor is further configured to store the BFI when the difference between the at least one of the value of the SNR or the value of the RSRP and the value of the RSSI is less than the difference threshold, and when the value of the RSSI is less than the RSSI threshold.

6. The apparatus of claim 1, wherein the at least one processor is further configured to measure at least one of a zero power (ZP) channel state information-reference signal (CSI-RS) or a non-zero power (NZP) CSI-RS, the ZP CSI-RS indicative of inter-cell interference, the NZP CSI-RS indicative of intra-cell interference.

7. An apparatus for wireless communication at a base station, comprising:
a memory; and
at least one processor coupled to the memory and configured to:
transmit, to a user equipment (UE), a beam failure detection-reference signal (BFD-RS), wherein one or more of a value of a received signal strength indicator (RSSI) or at least one of a value of a signal-to-noise ratio (SNR) or a value of a reference signal received power (RSRP) are based on the BFD-RS; and
receive, from the UE, a beam failure recovery (BFR) request based on at least one beam failure indicator (BFI) when at least one of the value of the SNR is less than a SNR threshold or the value of the RSRP is less than a RSRP threshold, and when the value of the RSSI is less than a RSSI threshold.

8. The apparatus of claim 7, wherein the at least one of the value of the SNR or the value of the RSRP is measured based on the BFD-RS transmitted to the UE.

9. The apparatus of claim 7, wherein the at least one processor is further configured to configure the UE with at least one of the SNR threshold of the SNR, the RSRP threshold of the RSRP, the RSSI threshold of the RSSI, or a difference threshold corresponding to the at least one of the value of the SNR or the value of the RSRP and the value of the RSSI.

10. The apparatus of claim 9, wherein at least one of the value of the SNR is compared to the SNR threshold, the value of the RSRP is compared to the RSRP threshold, or the value of the RSSI is compared to the RSSI threshold.

11. The apparatus of claim 9, wherein a difference between the at least one of the value of the SNR or the value of the RSRP and the value of the RSSI is compared to the difference threshold.

12. The apparatus of claim 11, wherein to receive the BFR request, the at least one processor is configured to receive the BFR request from the UE based on the difference between the at least one of the value of the SNR or the value of the RSRP and the value of the RSSI being less than the difference threshold, and the value of the RSSI being less than the RSSI threshold.

13. The apparatus of claim 7, wherein the at least one processor is further configured to configure the UE for at least one of a zero power (ZP) channel state information-reference signal (CSI-RS) or a non-zero power (NZP) CSI-RS, the ZP CSI-RS indicative of inter-cell interference, the NZP CSI-RS indicative of intra-cell interference.

14. A method of wireless communication at a user equipment (UE), comprising:
receiving, from a base station, a beam failure detection-reference signal (BFD-RS);
calculating, based on the BFD-RS, one or more of a value of a received signal strength indicator (RSSI) or at least one of a value of a signal-to-noise ratio (SNR) or a value of a reference signal received power (RSRP);
comparing at least one of the value of the SNR to a SNR threshold, the value of the RSRP to a RSRP threshold, or the value of the RSSI to a RSSI threshold; and
storing a beam failure indicator (BFI) when at least one of the value of the SNR is less than the SNR threshold or the value of the RSRP is less than the RSRP threshold, and when the value of the RSSI is less than the RSSI threshold.

15. The method of claim 14, further comprising:
measuring, based on the BFD-RS, at least one of the SNR or the RSRP, wherein the at least one of the value of the SNR or the value of the RSRP is calculated based on the measurement of the at least one of the SNR or the RSRP.

16. The method of claim 14, further comprising:
receiving a configuration from the base station for at least one of the SNR threshold of the SNR, the RSRP threshold of the RSRP, the RSSI threshold of the RSSI, or a difference threshold corresponding to the at least one of the value of the SNR or the value of the RSRP and the value of the RSSI.

17. The method of claim 16, further comprising:
comparing a difference between the at least one of the value of the SNR or the value of the RSRP and the value of the RSSI to the difference threshold.

18. The method of claim 17, wherein storing the BFI comprises storing the BFI when the difference between the at least one of the value of the SNR or the value of the RSRP and the value of the RSSI is less than the difference threshold, and when the value of the RSSI is less than the RSSI threshold.

19. The method of claim 14, further comprising:
measuring at least one of a zero power (ZP) channel state information-reference signal (CSI-RS) or a non-zero power (NZP) CSI-RS, the ZP CSI-RS indicative of inter-cell interference, the NZP CSI-RS indicative of intra-cell interference.

20. A method of wireless communication at a base station, comprising:
transmitting, to a user equipment (UE), a beam failure detection-reference signal (BFD-RS), wherein one or more of a value of a received signal strength indicator (RSSI) or at least one of a value of a signal-to-noise ratio (SNR) or a value of a reference signal received power (RSRP) are based on the BFD-RS; and
receiving, from the UE, a beam failure recovery (BFR) request based on at least one beam failure indicator (BFI) when at least one of the value of the SNR is less than a SNR threshold or the value of the RSRP is less than a RSRP threshold, and when the value of the RSSI is less than a RSSI threshold.

21. The method of claim 20, wherein the at least one of the value of the SNR or the value of the RSRP is measured based on the BFD-RS transmitted to the UE.

22. The method of claim 20, further comprising:
configuring the UE with at least one of the SNR threshold of the SNR, the RSRP threshold of the RSRP, the RSSI threshold of the RSSI, or a difference threshold corresponding to the at least one of the value of the SNR or the value of the RSRP and the value of the RSSI.

23. The method of claim 22, wherein at least one of the value of the SNR is compared to the SNR threshold, the value of the RSRP is compared to the RSRP threshold, or the value of the RSSI is compared to the RSSI threshold.

24. The method of claim 22, wherein a difference between the at least one of the value of the SNR or the value of the RSRP and the value of the RSSI is compared to the difference threshold.

25. The method of claim 24, wherein receiving the BFR request comprises receiving the BFR request from the UE based on the difference between the at least one of the value of the SNR or the value of the RSRP and the value of the RSSI being less than the difference threshold, and the value of the RSSI being less than the RSSI threshold.

26. The method of claim 20, further comprising:
 configuring the UE for at least one of a zero power (ZP) channel state information-reference signal (CSI-RS) or a non-zero power (NZP) CSI-RS, the ZP CSI-RS indicative of inter-cell interference, the NZP CSI-RS indicative of intra-cell interference.

* * * * *